United States Patent
Emans et al.

(10) Patent No.: US 9,147,198 B2
(45) Date of Patent: Sep. 29, 2015

(54) SYSTEMS AND METHODS FOR PROVIDING AN INTERFACE FOR DATA DRIVEN MEDIA PLACEMENT

(71) Applicant: United Video Properties, Inc., Santa Clara, CA (US)

(72) Inventors: Matthew Emans, Boston, MA (US); John Hoctor, Newton, MA (US); Jonathan Turner, Nashua, NH (US)

(73) Assignee: Rovi Technologies Corporation, Santa Clara, CA (US)

( * ) Notice: Subject to any disclaimer, the term of this patent is extended or adjusted under 35 U.S.C. 154(b) by 61 days.

(21) Appl. No.: 14/142,223

(22) Filed: Dec. 27, 2013

(65) Prior Publication Data

US 2014/0196081 A1    Jul. 10, 2014

Related U.S. Application Data

(60) Provisional application No. 61/750,809, filed on Jan. 10, 2013.

(51) Int. Cl.
*G06Q 30/02* (2012.01)
*H04N 21/262* (2011.01)
*H04N 21/2543* (2011.01)
*H04N 21/254* (2011.01)
*H04N 21/2547* (2011.01)
*H04N 21/2668* (2011.01)
*H04N 21/81* (2011.01)

(52) U.S. Cl.
CPC ........ *G06Q 30/0244* (2013.01); *G06Q 30/0241* (2013.01); *G06Q 30/0249* (2013.01); *G06Q 30/0264* (2013.01); *G06Q 30/0273* (2013.01); *H04N 21/2542* (2013.01); *H04N 21/2543* (2013.01); *H04N 21/2547* (2013.01); *H04N 21/2668* (2013.01); *H04N 21/26241* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 3,440,427 A | 4/1969 | Kammer | |
| 3,492,577 A | 1/1970 | Reiter et al. | |
| 3,493,674 A | 2/1970 | Houghton | |

(Continued)

FOREIGN PATENT DOCUMENTS

| | | | |
|---|---|---|---|
| AU | 731010 B2 | 3/2001 | |
| AU | 733993 B2 | 5/2001 | |

(Continued)

OTHER PUBLICATIONS

International Search Report and Written Opinion dated Jan. 7, 2015 in International Application No. PCT/US2014/010842.

(Continued)

*Primary Examiner* — Robert Hance
(74) *Attorney, Agent, or Firm* — Ropes & Gray LLP

(57) ABSTRACT

System and methods are presented for providing an interface to select advertising slots in an advertising campaign. In some embodiments, a user equipment device generates for display a plurality of cells in a grid arrangement. Each cell is associated with an advertising slot corresponding to a content source and a time period, and each cell includes a representation of an audience of the associated advertising slot. The user equipment device receives a user selection of a first cell of the plurality of cells, a function is executed with respect to a first advertising slot associated with the first cell.

20 Claims, 16 Drawing Sheets

(56) References Cited

U.S. PATENT DOCUMENTS

| | | |
|---|---|---|
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kru/ ger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman et al. |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,714,919 A | 12/1987 | Foster |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,899,139 A | 2/1990 | Ishimochi et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,942,391 A | 7/1990 | Kikuta |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |

(56) References Cited

U.S. PATENT DOCUMENTS

| | | |
|---|---|---|
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,075,771 A | 12/1991 | Hashimoto |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura et al. |
| 5,148,154 A | 9/1992 | MacKay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh |
| 5,172,111 A | 12/1992 | Olivo, Jr. |
| 5,172,413 A | 12/1992 | Bradley et al. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,788 A | 11/1993 | Takano et al. |
| 5,260,999 A | 11/1993 | Wyman |
| 5,283,639 A | 2/1994 | Esch et al. |
| 5,283,819 A | 2/1994 | Glick et al. |
| 5,285,278 A | 2/1994 | Holman |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,942 A | 12/1994 | Gilligan et al. |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,444,499 A | 8/1995 | Saitoh |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A | 9/1996 | Davis et al. |

(56) References Cited

U.S. PATENT DOCUMENTS

| | | |
|---|---|---|
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,606,374 A | 2/1997 | Bertram |
| 5,610,653 A | 3/1997 | Abecassis |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers, II et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,784,258 A | 7/1998 | Quinn |
| 5,790,202 A | 8/1998 | Kummer et al. |
| 5,790,426 A | 8/1998 | Robinson |
| 5,793,438 A | 8/1998 | Bedard |
| 5,793,964 A | 8/1998 | Rogers et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |

(56) References Cited

U.S. PATENT DOCUMENTS

| | | | |
|---|---|---|---|
| 5,838,314 | A | 11/1998 | Neel et al. |
| 5,842,010 | A | 11/1998 | Jain et al. |
| 5,842,199 | A | 11/1998 | Miller et al. |
| 5,844,620 | A | 12/1998 | Coleman et al. |
| 5,848,352 | A | 12/1998 | Dougherty et al. |
| 5,848,396 | A | 12/1998 | Gerace |
| 5,848,397 | A | 12/1998 | Marsh et al. |
| 5,850,218 | A | 12/1998 | LaJoie et al. |
| 5,862,292 | A | 1/1999 | Kubota et al. |
| 5,867,226 | A | 2/1999 | Wehmeyer et al. |
| 5,867,227 | A | 2/1999 | Yamaguchi |
| 5,872,588 | A | 2/1999 | Aras et al. |
| 5,874,985 | A | 2/1999 | Matthews, III |
| 5,875,108 | A | 2/1999 | Hoffberg et al. |
| 5,880,768 | A | 3/1999 | Lemmons et al. |
| 5,883,677 | A | 3/1999 | Hofmann |
| 5,886,691 | A | 3/1999 | Furuya et al. |
| 5,886,731 | A | 3/1999 | Ebisawa |
| 5,892,498 | A | 4/1999 | Marshall et al. |
| 5,892,535 | A | 4/1999 | Allen et al. |
| 5,900,905 | A | 5/1999 | Shoff et al. |
| 5,903,314 | A | 5/1999 | Niijima et al. |
| 5,903,545 | A | 5/1999 | Sabourin et al. |
| 5,903,816 | A | 5/1999 | Broadwin et al. |
| 5,905,497 | A | 5/1999 | Vaughan et al. |
| 5,907,323 | A | 5/1999 | Lawler et al. |
| 5,907,366 | A | 5/1999 | Farmer et al. |
| 5,914,746 | A | 6/1999 | Matthews, III et al. |
| 5,917,481 | A | 6/1999 | Rzeszewski et al. |
| 5,917,830 | A | 6/1999 | Chen et al. |
| 5,918,014 | A | 6/1999 | Robinson |
| 5,920,700 | A | 7/1999 | Gordon et al. |
| 5,929,849 | A | 7/1999 | Kikinis |
| 5,929,850 | A | 7/1999 | Broadwin et al. |
| 5,936,679 | A | 8/1999 | Kasahara et al. |
| 5,940,073 | A | 8/1999 | Klosterman et al. |
| 5,940,572 | A | 8/1999 | Balaban et al. |
| 5,945,988 | A | 8/1999 | Williams et al. |
| 5,951,642 | A | 9/1999 | Onoe et al. |
| 5,959,688 | A | 9/1999 | Schein et al. |
| 5,960,411 | A | 9/1999 | Hartman et al. |
| 5,973,683 | A | 10/1999 | Cragun et al. |
| 5,974,222 | A | 10/1999 | Yuen et al. |
| 5,977,964 | A | 11/1999 | Williams et al. |
| 5,986,650 | A | 11/1999 | Ellis et al. |
| 5,988,078 | A | 11/1999 | Levine |
| 5,990,890 | A | 11/1999 | Etheredge |
| 5,990,927 | A | 11/1999 | Hendricks et al. |
| 5,999,912 | A | 12/1999 | Wodarz et al. |
| 6,002,393 | A | 12/1999 | Hite et al. |
| 6,002,394 | A | 12/1999 | Schein et al. |
| 6,005,562 | A | 12/1999 | Shiga et al. |
| 6,005,565 | A | 12/1999 | Legall et al. |
| 6,005,597 | A | 12/1999 | Barrett et al. |
| 6,006,257 | A | 12/1999 | Slezak |
| 6,008,802 | A | 12/1999 | Iki et al. |
| 6,011,546 | A | 1/2000 | Bertram |
| 6,014,137 | A | 1/2000 | Burns |
| 6,014,502 | A | 1/2000 | Moraes |
| 6,016,141 | A | 1/2000 | Knudson et al. |
| 6,018,372 | A | 1/2000 | Etheredge |
| 6,018,768 | A | 1/2000 | Ullman et al. |
| 6,020,883 | A | 2/2000 | Herz et al. |
| 6,020,929 | A | 2/2000 | Marshall et al. |
| 6,025,837 | A | 2/2000 | Matthews, III et al. |
| 6,025,886 | A | 2/2000 | Koda |
| 6,028,599 | A | 2/2000 | Yuen et al. |
| 6,029,045 | A | 2/2000 | Picco et al. |
| 6,029,195 | A | 2/2000 | Herz |
| 6,035,304 | A | 3/2000 | Machida et al. |
| 6,047,317 | A | 4/2000 | Bisdikian et al. |
| 6,049,824 | A | 4/2000 | Simonin |
| 6,052,145 | A | 4/2000 | Macrae et al. |
| 6,061,060 | A | 5/2000 | Berry et al. |
| 6,061,097 | A | 5/2000 | Satterfield |
| 6,064,376 | A | 5/2000 | Berezowski et al. |
| 6,064,980 | A | 5/2000 | Jacobi et al. |
| 6,067,303 | A | 5/2000 | Aaker et al. |
| 6,072,460 | A | 6/2000 | Marshall et al. |
| 6,075,526 | A | 6/2000 | Rothmuller |
| 6,075,551 | A | 6/2000 | Berezowski et al. |
| 6,075,575 | A | 6/2000 | Schein et al. |
| 6,078,348 | A | 6/2000 | Klosterman et al. |
| 6,081,750 | A | 6/2000 | Hoffberg et al. |
| 6,088,722 | A | 7/2000 | Herz et al. |
| 6,091,883 | A | 7/2000 | Artigalas et al. |
| 6,098,065 | A | 8/2000 | Skillen et al. |
| 6,108,042 | A | 8/2000 | Adams et al. |
| 6,111,614 | A | 8/2000 | Mugura et al. |
| 6,112,186 | A | 8/2000 | Bergh et al. |
| 6,115,057 | A | 9/2000 | Kwoh et al. |
| 6,118,492 | A | 9/2000 | Milnes et al. |
| 6,119,098 | A | 9/2000 | Guyot et al. |
| 6,119,101 | A | 9/2000 | Peckover |
| 6,122,011 | A | 9/2000 | Dias et al. |
| 6,125,230 | A | 9/2000 | Yaginuma |
| 6,133,909 | A | 10/2000 | Schein et al. |
| 6,141,003 | A | 10/2000 | Chor et al. |
| 6,147,714 | A | 11/2000 | Terasawa et al. |
| 6,151,059 | A | 11/2000 | Schein et al. |
| 6,154,203 | A | 11/2000 | Yuen et al. |
| 6,157,413 | A | 12/2000 | Hanafee et al. |
| 6,160,545 | A | 12/2000 | Eyer et al. |
| 6,160,546 | A | 12/2000 | Thompson et al. |
| 6,160,570 | A | 12/2000 | Sitnik |
| 6,163,316 | A | 12/2000 | Killian |
| 6,169,542 | B1 | 1/2001 | Hooks et al. |
| 6,172,674 | B1 | 1/2001 | Etheredge |
| 6,172,677 | B1 | 1/2001 | Stautner et al. |
| 6,173,271 | B1 | 1/2001 | Goodman et al. |
| 6,177,931 | B1 | 1/2001 | Alexander et al. |
| 6,178,446 | B1 | 1/2001 | Gerszberg et al. |
| 6,181,335 | B1 | 1/2001 | Hendricks et al. |
| 6,186,443 | B1 | 2/2001 | Shaffer |
| 6,191,780 | B1 | 2/2001 | Martin et al. |
| 6,202,212 | B1 | 3/2001 | Sturgeon et al. |
| 6,209,129 | B1 | 3/2001 | Carr et al. |
| 6,209,130 | B1 | 3/2001 | Rector, Jr. et al. |
| 6,216,264 | B1 | 4/2001 | Maze et al. |
| 6,239,794 | B1 | 5/2001 | Yuen et al. |
| 6,240,555 | B1 | 5/2001 | Shoff et al. |
| 6,253,203 | B1 | 6/2001 | O'Flaherty et al. |
| 6,256,071 | B1 | 7/2001 | Hiroi |
| 6,256,785 | B1 | 7/2001 | Klappert et al. |
| 6,257,268 | B1 | 7/2001 | Hope et al. |
| 6,262,721 | B1 | 7/2001 | Tsukidate et al. |
| 6,263,501 | B1 | 7/2001 | Schein et al. |
| 6,263,507 | B1 | 7/2001 | Ahmad et al. |
| 6,268,849 | B1 | 7/2001 | Boyer et al. |
| 6,269,361 | B1 | 7/2001 | Davis et al. |
| 6,275,268 | B1 | 8/2001 | Ellis et al. |
| 6,279,157 | B1 | 8/2001 | Takasu |
| 6,285,713 | B1 | 9/2001 | Nakaya et al. |
| 6,286,140 | B1 | 9/2001 | Ivanyi |
| 6,289,346 | B1 | 9/2001 | Milewski et al. |
| 6,298,482 | B1 | 10/2001 | Seidman et al. |
| 6,311,877 | B1 | 11/2001 | Yang |
| 6,312,336 | B1 | 11/2001 | Handelman et al. |
| 6,320,588 | B1 | 11/2001 | Palmer et al. |
| 6,323,911 | B1 | 11/2001 | Schein et al. |
| 6,331,877 | B1 | 12/2001 | Bennington et al. |
| 6,341,195 | B1 | 1/2002 | Mankovitz et al. |
| 6,342,926 | B1 | 1/2002 | Hanafee et al. |
| 6,357,042 | B2 | 3/2002 | Srinivasan et al. |
| 6,363,525 | B1 | 3/2002 | Dougherty et al. |
| 6,381,582 | B1 | 4/2002 | Walker et al. |
| 6,388,714 | B1 | 5/2002 | Schein et al. |
| 6,389,403 | B1 | 5/2002 | Dorak, Jr. |
| 6,389,593 | B1 | 5/2002 | Yamagishi |
| 6,392,710 | B1 | 5/2002 | Gonsalves et al. |
| 6,396,546 | B1 | 5/2002 | Alten et al. |
| 6,400,407 | B1 | 6/2002 | Zigmond et al. |
| 6,405,371 | B1 | 6/2002 | Oosterhout et al. |
| 6,408,437 | B1 | 6/2002 | Hendricks et al. |

(56) References Cited

U.S. PATENT DOCUMENTS

| | | |
|---|---|---|
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,446,261 B1 | 9/2002 | Rosser |
| 6,453,471 B1 | 9/2002 | Klosterman |
| 6,456,331 B2 | 9/2002 | Kwoh |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,505,348 B1 | 1/2003 | Knowles et al. |
| 6,515,680 B1 | 2/2003 | Hendricks et al. |
| 6,539,548 B1 | 3/2003 | Hendricks et al. |
| 6,542,169 B1 | 4/2003 | Marshall et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,604,138 B1 | 8/2003 | Virine et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,047,550 B1 * | 5/2006 | Yasukawa et al. ............... 725/44 |
| 7,069,576 B1 | 6/2006 | Knudson et al. |
| 7,136,871 B2 * | 11/2006 | Ozer et al. ............................. 1/1 |
| 7,185,355 B1 | 2/2007 | Ellis et al. |
| 7,266,833 B2 | 9/2007 | Ward, III et al. |
| 7,293,276 B2 | 11/2007 | Phillips et al. |
| 7,328,450 B2 | 2/2008 | Macrae et al. |
| 7,392,532 B2 | 6/2008 | White et al. |
| 7,480,929 B2 | 1/2009 | Klosterman et al. |
| 7,668,832 B2 | 2/2010 | Yeh et al. |
| 7,861,261 B2 * | 12/2010 | Haberman et al. ............... 725/35 |
| 8,326,685 B2 * | 12/2012 | Schepers et al. ........... 705/14.43 |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0007310 A1 | 1/2002 | Long |
| 2002/0023263 A1 | 2/2002 | Ahn et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049973 A1 | 4/2002 | Alten et al. |
| 2002/0059602 A1 | 5/2002 | Macrae et al. |
| 2002/0073424 A1 | 6/2002 | Ward et al. |
| 2002/0083439 A1 | 6/2002 | Eldering |
| 2002/0092017 A1 | 7/2002 | Klosterman et al. |
| 2002/0116717 A1 | 8/2002 | Eller et al. |
| 2002/0120933 A1 | 8/2002 | Knudson et al. |
| 2002/0124249 A1 | 9/2002 | Shintani et al. |
| 2003/0005432 A1 | 1/2003 | Ellis et al. |
| 2003/0005445 A1 | 1/2003 | Schein et al. |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2003/0220866 A1 | 11/2003 | Pisaris-Henderson et al. |
| 2004/0003407 A1 | 1/2004 | Hanafee et al. |
| 2004/0049787 A1 | 3/2004 | Maissel et al. |
| 2004/0078809 A1 | 4/2004 | Drazin |
| 2004/0103024 A1 | 5/2004 | Patel et al. |
| 2004/0103439 A1 | 5/2004 | Macrae et al. |
| 2004/0111742 A1 | 6/2004 | Hendricks et al. |
| 2004/0139465 A1 | 7/2004 | Matthews et al. |
| 2004/0168189 A1 | 8/2004 | Reynolds et al. |
| 2004/0194131 A1 | 9/2004 | Ellis et al. |
| 2004/0194138 A1 | 9/2004 | Boylan et al. |
| 2005/0010949 A1 | 1/2005 | Ward et al. |
| 2005/0015800 A1 * | 1/2005 | Holcomb ........................ 725/35 |
| 2005/0015804 A1 | 1/2005 | LaJoie et al. |
| 2005/0050027 A1 | 3/2005 | Yeh et al. |
| 2005/0097622 A1 | 5/2005 | Zigmond et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0216936 A1 | 9/2005 | Knudson et al. |
| 2005/0229214 A1 | 10/2005 | Young et al. |
| 2005/0235321 A1 | 10/2005 | Ahmad-Taylor |
| 2005/0244138 A1 | 11/2005 | O'Connor et al. |
| 2005/0283796 A1 | 12/2005 | Flickinger |
| 2006/0118619 A1 | 6/2006 | Hulst et al. |
| 2006/0184960 A1 | 8/2006 | Horton et al. |
| 2006/0205510 A1 | 9/2006 | Lauper et al. |
| 2006/0248555 A1 | 11/2006 | Eldering |
| 2007/0016926 A1 | 1/2007 | Ward et al. |
| 2007/0033613 A1 | 2/2007 | Ward et al. |
| 2007/0038509 A1 * | 2/2007 | Jain et al. ........................ 705/14 |
| 2007/0162934 A1 | 7/2007 | Roop et al. |
| 2007/0186240 A1 | 8/2007 | Ward et al. |
| 2007/0217762 A1 | 9/2007 | Yahata |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184315 A1 | 7/2008 | Ellis et al. |
| 2008/0189734 A1 * | 8/2008 | Schepers et al. ................ 725/32 |
| 2008/0189744 A1 | 8/2008 | Schein et al. |
| 2008/0228893 A1 | 9/2008 | MacDonald et al. |
| 2008/0235725 A1 | 9/2008 | Hendricks |
| 2008/0256056 A1 | 10/2008 | Chang et al. |
| 2009/0055268 A1 * | 2/2009 | Knoller et al. .................. 705/14 |
| 2009/0089131 A1 * | 4/2009 | Moukas et al. .................... 705/8 |
| 2010/0191600 A1 | 7/2010 | Sideman |
| 2010/0241516 A1 * | 9/2010 | Kim et al. .................. 705/14.73 |
| 2011/0035255 A1 * | 2/2011 | Dasher et al. .................... 705/10 |

FOREIGN PATENT DOCUMENTS

| | | |
|---|---|---|
| CA | 1030505 A1 | 5/1978 |
| CA | 1187197 A1 | 5/1985 |
| CA | 1188811 A1 | 6/1985 |
| CA | 1196082 A1 | 10/1985 |
| CA | 1200911 A1 | 2/1986 |
| CA | 2151458 A1 | 6/1994 |
| CA | 2164608 A1 | 12/1994 |
| CA | 2297039 A1 | 1/1999 |
| CA | 2312326 A1 | 6/1999 |

(56) References Cited

FOREIGN PATENT DOCUMENTS

| | | |
|---|---|---|
| CN | 1555191 | 12/2004 |
| DE | 29 18 846 | 11/1980 |
| DE | 3246225 A1 | 6/1984 |
| DE | 3337204 | 4/1985 |
| DE | 36 21 263 A1 | 1/1988 |
| DE | 3909334 A1 | 9/1990 |
| DE | 4201031 A1 | 7/1993 |
| DE | 19 531 121 A1 | 2/1997 |
| DE | 19 740 079 A1 | 3/1999 |
| DE | 19 931 046 A1 | 1/2001 |
| EP | 0 239 884 A1 | 10/1987 |
| EP | 0396062 A2 | 11/1990 |
| EP | 0401930 A2 | 12/1990 |
| EP | 0408892 A1 | 1/1991 |
| EP | 0420123 A2 | 4/1991 |
| EP | 0424648 A2 | 5/1991 |
| EP | 0444496 | 9/1991 |
| EP | 0447968 A2 | 9/1991 |
| EP | 0532322 A2 | 3/1993 |
| EP | 0550911 A1 | 7/1993 |
| EP | 0 560 593 | 9/1993 |
| EP | 0 572 090 | 12/1993 |
| EP | 0 682 452 A2 | 11/1995 |
| EP | 0721253 A2 | 7/1996 |
| EP | 0725539 A2 | 8/1996 |
| EP | 0752767 A2 | 1/1997 |
| EP | 0753964 A1 | 1/1997 |
| EP | 0762751 A2 | 3/1997 |
| EP | 0772360 | 5/1997 |
| EP | 0774866 A2 | 5/1997 |
| EP | 0775417 A1 | 5/1997 |
| EP | 0784405 | 7/1997 |
| EP | 0805594 A2 | 11/1997 |
| EP | 0822718 | 2/1998 |
| EP | 0827340 A2 | 3/1998 |
| EP | 0834798 | 4/1998 |
| EP | 0848554 A2 | 6/1998 |
| EP | 0849948 | 6/1998 |
| EP | 0 854 645 | 7/1998 |
| EP | 0851681 | 7/1998 |
| EP | 0852442 A1 | 7/1998 |
| EP | 0854654 | 7/1998 |
| EP | 0880856 A1 | 12/1998 |
| EP | 0905985 A2 | 3/1999 |
| EP | 0924927 | 6/1999 |
| EP | 0935393 A2 | 8/1999 |
| EP | 0944253 A1 | 9/1999 |
| EP | 0963119 A1 | 12/1999 |
| EP | 0988876 A1 | 3/2000 |
| EP | 1095504 A2 | 5/2001 |
| EP | 1036466 | 3/2003 |
| FR | 2662895 A1 | 12/1991 |
| GB | 1 554 411 | 10/1979 |
| GB | 2034995 A | 6/1980 |
| GB | 2126002 A | 3/1984 |
| GB | 2185670 A | 7/1987 |
| GB | 2256546 A | 12/1992 |
| GB | 2264409 A | 8/1993 |
| GB | 2309134 A | 7/1997 |
| HK | 1035285 | 3/2005 |
| JP | 58137334 A | 8/1983 |
| JP | 58196738 A | 11/1983 |
| JP | 58210776 A | 12/1983 |
| JP | 59141878 A | 8/1984 |
| JP | 61050470 A | 3/1986 |
| JP | 61074476 A | 4/1986 |
| JP | 62-060370 | 3/1987 |
| JP | 62060384 A | 3/1987 |
| JP | 63234679 A | 9/1988 |
| JP | 01307944 A | 12/1989 |
| JP | 02048879 A | 2/1990 |
| JP | 03063990 A | 3/1991 |
| JP | 04227380 | 8/1992 |
| JP | 04-335395 A | 11/1992 |
| JP | 05-183826 | 7/1993 |
| JP | 05284437 A | 10/1993 |
| JP | 06021907 | 1/1994 |
| JP | 60-61935 A | 3/1994 |
| JP | 07020254 | 1/1995 |
| JP | 07-050259 | 2/1995 |
| JP | 07-076592 | 3/1995 |
| JP | 07123326 | 5/1995 |
| JP | 07147657 A | 6/1995 |
| JP | 07-288759 | 10/1995 |
| JP | 07-321748 | 12/1995 |
| JP | 08-32528 | 2/1996 |
| JP | 0832538 | 2/1996 |
| JP | 08125497 | 5/1996 |
| JP | 08251122 | 9/1996 |
| JP | 08275077 | 10/1996 |
| JP | 09-37168 | 2/1997 |
| JP | 09037151 A | 2/1997 |
| JP | 09037172 A | 2/1997 |
| JP | 09-102827 A | 4/1997 |
| JP | 10-143340 | 5/1998 |
| JP | 10-143349 | 5/1998 |
| JP | 2838892 | 10/1998 |
| JP | 10-512420 | 11/1998 |
| JP | 3101704 B2 | 10/2000 |
| JP | 2001-213595 | 8/2001 |
| JP | 2001-1513595 | 8/2001 |
| JP | 2002-024525 A | 1/2002 |
| JP | 2002-279969 | 9/2002 |
| JP | 2005216035 A | 8/2005 |
| JP | 4062577 | 3/2008 |
| WO | WO-86/01359 A1 | 2/1986 |
| WO | WO-86/01962 | 3/1986 |
| WO | WO-87/03766 | 6/1987 |
| WO | WO-88/04057 A1 | 6/1988 |
| WO | WO-88/04507 | 6/1988 |
| WO | WO-8902682 A1 | 3/1989 |
| WO | WO-89/03085 | 4/1989 |
| WO | WO-89/12370 | 12/1989 |
| WO | WO-90/01243 A1 | 2/1990 |
| WO | WO-90/15507 | 12/1990 |
| WO | WO-9100670 | 1/1991 |
| WO | WO-91/05436 A1 | 4/1991 |
| WO | WO-91/18476 A1 | 11/1991 |
| WO | WO-92/04801 | 3/1992 |
| WO | WO-9304473 | 3/1993 |
| WO | WO-9305452 A1 | 3/1993 |
| WO | WO-93/11638 | 6/1993 |
| WO | WO-93/11639 | 6/1993 |
| WO | WO-93/11640 | 6/1993 |
| WO | WO-93/23957 A1 | 11/1993 |
| WO | WO-94/13107 | 6/1994 |
| WO | WO-94/14282 A1 | 6/1994 |
| WO | WO-94/14283 A1 | 6/1994 |
| WO | WO-94/14284 A1 | 6/1994 |
| WO | WO-9414281 A1 | 6/1994 |
| WO | WO-9421085 A1 | 9/1994 |
| WO | WO-94/23383 A1 | 10/1994 |
| WO | WO-94/29811 A1 | 12/1994 |
| WO | WO-95/01056 | 1/1995 |
| WO | WO-95/01057 A1 | 1/1995 |
| WO | WO-95/01058 A1 | 1/1995 |
| WO | WO-95/01059 A1 | 1/1995 |
| WO | WO-95/06389 A1 | 3/1995 |
| WO | WO-95/07003 | 3/1995 |
| WO | WO-95/10910 | 4/1995 |
| WO | WO-95/15658 A1 | 6/1995 |
| WO | WO-95/16568 A1 | 6/1995 |
| WO | WO-9515649 A1 | 6/1995 |
| WO | WO-9515657 A1 | 6/1995 |
| WO | WO-95/19092 A1 | 7/1995 |
| WO | WO-95/26608 A1 | 10/1995 |
| WO | WO-95/28055 A1 | 10/1995 |
| WO | WO-95/28799 A1 | 10/1995 |
| WO | WO-95/30961 A1 | 11/1995 |
| WO | WO-95/32585 | 11/1995 |
| WO | WO-9531069 | 11/1995 |
| WO | WO-9532583 A1 | 11/1995 |
| WO | WO-96/07270 A1 | 3/1996 |
| WO | WO-96/08109 A1 | 3/1996 |

(56) References Cited

FOREIGN PATENT DOCUMENTS

| | | |
|---|---|---|
| WO | WO-96/09721 A1 | 3/1996 |
| WO | WO-9608113 A1 | 3/1996 |
| WO | WO-96/13932 A1 | 5/1996 |
| WO | WO-9613935 A1 | 5/1996 |
| WO | WO-96/17467 A2 | 6/1996 |
| WO | WO-9617473 | 6/1996 |
| WO | WO-9621990 A2 | 7/1996 |
| WO | WO-96/26605 | 8/1996 |
| WO | WO-9627270 A1 | 9/1996 |
| WO | WO-9627982 | 9/1996 |
| WO | WO-96/31980 A1 | 10/1996 |
| WO | WO-96/34467 A1 | 10/1996 |
| WO | WO-96/34486 A1 | 10/1996 |
| WO | WO-96/34491 A1 | 10/1996 |
| WO | WO-96/38799 A1 | 12/1996 |
| WO | WO-96/41477 A1 | 12/1996 |
| WO | WO-96/41478 | 12/1996 |
| WO | WO-9641471 A1 | 12/1996 |
| WO | WO-97/02702 A2 | 1/1997 |
| WO | WO-97/04595 A1 | 2/1997 |
| WO | WO-9707656 | 3/1997 |
| WO | WO-97/13368 | 4/1997 |
| WO | WO-97/17774 A1 | 5/1997 |
| WO | WO-97/18675 | 5/1997 |
| WO | WO-97/26612 A1 | 7/1997 |
| WO | WO-97/31480 | 8/1997 |
| WO | WO-97/41673 A2 | 11/1997 |
| WO | WO-97/42763 | 11/1997 |
| WO | WO-97/48230 | 12/1997 |
| WO | WO-97/49237 | 12/1997 |
| WO | WO-97/49241 | 12/1997 |
| WO | WO-97/49242 | 12/1997 |
| WO | WO-98/06219 | 2/1998 |
| WO | WO-98/10589 A1 | 3/1998 |
| WO | WO-98/16062 | 4/1998 |
| WO | WO-98/17064 A1 | 4/1998 |
| WO | WO-98/20675 A1 | 5/1998 |
| WO | WO-98/26584 | 6/1998 |
| WO | WO-98/27723 | 6/1998 |
| WO | WO-9826569 A2 | 6/1998 |
| WO | WO-98/28906 A2 | 7/1998 |
| WO | WO-98/31148 A1 | 7/1998 |
| WO | WO-98/41020 A1 | 9/1998 |
| WO | WO-98/43183 A1 | 10/1998 |
| WO | WO-98/47279 | 10/1998 |
| WO | WO-98/48566 A2 | 10/1998 |
| WO | WO-98/56172 A1 | 12/1998 |
| WO | WO-99/01984 A1 | 1/1999 |
| WO | WO-99/04561 | 1/1999 |
| WO | WO-99/07142 A1 | 2/1999 |
| WO | WO-99/14947 A1 | 3/1999 |
| WO | WO-9918722 | 4/1999 |
| WO | WO-99/29109 A1 | 6/1999 |
| WO | WO-99/30491 A1 | 6/1999 |
| WO | WO-99/31480 A1 | 6/1999 |
| WO | WO-99/45700 | 9/1999 |
| WO | WO-99/45701 A1 | 9/1999 |
| WO | WO-99/45702 | 9/1999 |
| WO | WO-99/52285 A1 | 10/1999 |
| WO | WO-99/56466 | 11/1999 |
| WO | WO-99/56473 A1 | 11/1999 |
| WO | WO-99/60783 | 11/1999 |
| WO | WO-99/60789 | 11/1999 |
| WO | WO-00/04706 A2 | 1/2000 |
| WO | WO-00/04708 A1 | 1/2000 |
| WO | WO-0005889 A1 | 2/2000 |
| WO | WO-00/11865 A1 | 3/2000 |
| WO | WO-00/13415 A2 | 3/2000 |
| WO | WO-00/16548 | 3/2000 |
| WO | WO-00/28734 | 5/2000 |
| WO | WO-0027122 A1 | 5/2000 |
| WO | WO-00/33560 A2 | 6/2000 |
| WO | WO-00/33573 A1 | 6/2000 |
| WO | WO-0033160 A2 | 6/2000 |
| WO | WO-0033224 A1 | 6/2000 |
| WO | WO-00/49801 A1 | 8/2000 |
| WO | WO-00/79798 | 12/2000 |
| WO | WO-01/01677 A1 | 1/2001 |
| WO | WO-01/06784 A2 | 1/2001 |
| WO | WO-01/15438 A1 | 3/2001 |
| WO | WO-01/35662 A1 | 5/2001 |
| WO | WO-0189213 A1 | 11/2001 |
| WO | WO-0203227 | 1/2002 |
| WO | WO-02/31731 A2 | 4/2002 |
| WO | WO-02/057934 A1 | 7/2002 |
| WO | WO-02/084992 A2 | 10/2002 |

OTHER PUBLICATIONS

U.S. Appl. No. 14/142,226, filed Dec. 27, 2013 titled "Systems and Methods for Optimizing Data Driven Media Placement".
U.S. Appl. No. 14/142,120, filed Dec. 27, 2013 titled "Systems and Methods for Setting Prices in Data Driven Media Placement".
U.S. Appl. No. 09/330,792, filed Jun. 11, 1999, Knudson et al.
U.S. Appl. No. 09/332,244, filed Jun. 11, 1999, Ellis et al.
"'Duck Tales,'(1987)[TV Series 1987-1990]," Internet Movie Database (IMDB) [Retrieved on Apr. 7, 2007].
"272OR Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau Nov. 1994 Perspektiven, Video on Demand, pp. 78-79. (English language translation attached).
"Digital Video Broadcasting (DVB); DVB specification for data broadcasting," *European Telecommunication Standards Institute, Draft EN* 301 192 V1.2.1 (Jan. 1999).
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvef.com/library/spec.html, printed Aug. 22, 2001, the document bears a Copyright date of 1998, 1999, 2000.
"Facsimile Transmission," NHK Research Monthly Report, Dec. 1987(Unknown author).
"Getting Started" Installation Guide, "Using StarSight 1" Manual, and Remote Control "Quick Reference Guide.".
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
"Lists> What's on Tonite! TV Listings (fwd)," Internet article (On line), Jan. 28, 1995, XP 002378869 [Retrieved on Apr. 28, 2006].
"MSI Datacasting Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.

(56) References Cited

OTHER PUBLICATIONS

"Prevue Networks and OpenTV(R) Agree to Work Together on Deploying Interactive Program Guides Worldwide," from the internet at http://www.opentv.com/news/prevuefinal.htm, printed on Jun. 28, 1999.
"Probe XL Brochure, Auto Tote Systems Inc.," (Newark, Delaware) (undated) 57 pgs.
"Prodigy Launches Interactive TV Listing", Apr. 22, 1994 public Broadcasting Report.
"Rewind, reply and unwind with new high-tech TV devices," by Lawrence J. Magid, LA Times. This document was printed from the internet on Jun. 6, 1999 and bears a date of May 19, 1999.
"StarSight Interactive Television Program Guide III" Jim Leftwich and Steve Schein, Functional/Interactional Architecture Specification Document, Orbit Interaction, Palo alto, California, Published before Apr. 19, 1995.
"StarSight Interactive Television Program Guide IV" Jim Leftwich and Steve Schein, Functional/Interactional Architecture Specification Document, Orbit Interaction, Palo Alto, California, Published before Apr. 19, 1995.
"StarSight Interactive Television Program Guide" Jim Leftwich, Willy Lai & Steve Schein Published before Apr. 19, 1995.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Guide Online Set for Fall", Entertainment Marketing Letter, Aug. 1994.
"TV Listings Functional Spec.," Time Video Information Services, Inc., undated.
"Using StarSight 2," Instruction Manual, StarSight Telecast, Inc., Starsight CB 1500 Customer Letter, 1994.
"*Windows 98 Feature Combines TV, Terminal and the Internet," New York Times*, Aug. 18, 1998.
Advertisement for "TV Decisions," *Cable Vision*, Aug. 4, 1986.
Alexander, Michael "Visualizing cleared-off desktops," *Computerworld*, May 6, 1991, p. 20.
Antonoff, M., "Stay Tuned for Smart TV," *Popular Science*, Nov. 1990, pp. 62-65.
Bach, U. et al., "Multimedia TV Set, Part 1" Radio-Fernsehen Elektronik (RFE), Sep. 1996, pp. 28, 30, 31. (English language translation attached.).
Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, Nov. 1979, pp. 765-771.
Bensch, U., "VPV Videotext Programs Videorecorder," *IEEE Paper*, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present The CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, On Your Home TV Screen," Time Teletext, Time Video Information Services, Inc., undated (V 79167-79175).

Brochure, VTN "*Videotoken Network, New Dimension Television*," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
*Cable Computer User's Guide, Rev. 1*, Dec. 1985 (Plaintiff's Exhibit 289).
*CableData, Roseville Consumer Presentation*, Mar. 1985.
Came, E.B., "The Wired Household," *IEEE Spectrum*, vol. 16 No. 10, Oct. 1979, pp. 61-66.
Chan, Patrick P., "Learning Considerations In User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," *publication of the Institute for Computer Research*, University of Waterloo, Waterloo, Ontario, Canada Jul. 1988 pp. 219-227.
Office Actions and Replies from U.S. Appl. No. 10/453,388.
Cox, J. et al, "Extended Services in a Digital Compression System," Proceedings from Eleven Technical Sessions: 42nd Annual Convention and Exposition of the National Cable Television Association, Jun. 1993, pp. 185-191.
Damouny, N.G., "Teletext Decoders-Keeping Up With the Latest Advances," IEEE Transactions on Consumer Electronics, vol. CE-30, No. 3, Aug. 1984, pp. 429-435.
Declaration Under 37 C.F.R. § 1.132 of Richard E. Glassberg, signed Oct. 20, 2006, filed Oct. 24, 2006, from U.S. Appl. No. 10/346,266.
DiRosa, S. "BIGSURF Netguide", Jul. 1995, vol. 3.1 (Sections 18,21, and 28—renumbered as pp. 1-27).
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Femsehen-EPG Und 'Lesezeichen'," RTM Rundfunktechnische Mitteilungen, Jun. 1997, vol. 41, pp. 67-72.
European Search Report dated Nov. 19, 2002 from European Application No. 989446111.7.
*European Telecommunication Standard, "Electronic Programme Guide (EPG); Protocol for a TV Guide using electronic data transmission*," pp. 1-45, sections 1-11.12.7 and annex A-P, bearing a date of May 1997.
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (*Broadcast Engineering Reports*), vol. 26 No. 6, pp. 254-257, Nov.-Dec. 1982.
Installation Guide, "Getting Started 1" Manual, and Remote Control "Quick Reference Guide."
Instruction Manual, "Using StarSight 2," StarSight Telecast, Inc., StarSight CB 1500 Customer Letter, 1994.
Instructional Manual, "Sonic the Hedgehog," Sega of America, 1992.
International Search Report for International application No. PCT/US06/30073 mailed Jul. 7, 2008, 1 page.
James, A., "Oracle—Broadcasting the Written Word," *Wireless World*, Jul. 1973, vol. 79 No. 1453, pp. 314-316.
Judice, C.N., "Move Over Cable, Here Comes Video Via Voice Lines," Network World, Sep. 1986, p. 26.

(56) References Cited

OTHER PUBLICATIONS

Kai et al "Development of a Simulation System for Integrated Services Television," Report from Information Processing Society of Japan, Japan, Sep. 13, 1996, vol. 96, No. 90 pgs.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," *Radio Fernsehen Elektronik*, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiff's Exhibit 298).
*Listing of computer code for Video HTU Program* (Plaintiff's Exhibit 299).
Lowenstein, R.L. and Alter, H.E., "The Inevitable March of Videotex," *Technology Review*, vol. 88, Oct. 1985, p. 22.
M/A-COM, Inc., "*Videocipher II Satellite Descrambler Owner's Manual*," dated Prior Feb. 1986, pp. 1-17.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiffs Exhibit 325).
Markowitz, A. "*Companies Jump on Interactive Bandwagon*," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell, R.G., "Tac Timer," 1986 NCTA Technical Papers, pp. 203-206.
Neumann, Andreas, "WDR Online Aufbau and Perspektiven Automatisierter Online-Dienste im WDR," *RTM Rundfunktechnische Mitteilungen*, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Pfister, Larry T., "Teletext: Its Time Has Come," Prepared for the IGC Videotext / Teletext Conference, Andover, Massachusetts, Dec. 14, 1982, pp. 1-11.
Prevue Guide Brochure, Spring 1984.
Prevue Guide Brochure, Spring 1994.
Rayers, D.J., "Telesoftware by Teletext," 1984 IEEE Conference Papers, vol. 240, p. 323.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.
Schlender, B.R., "Couch Potatoes! Now It's Smart TV," *Fortune*, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic, Dec. 1984.
Sunada, K. et al, "Teletext Color Television Receiver Model C-29M950, C26M940," NEC Home Electronics , NEC Giho, 1987.
Supplementary European Search Report for Application No. EP 98 93 5889, completed on Sep. 28, 2001.
Sussman, A. "*GTE Tunes in to Home TV Shopping*,"PC Week, Jun. 28, 1988, p. C15.
Tech Notes: Product Updates from M/A-COM Cable Home Group, "*Videocipher Owner's Manual Update*," Issue No. 6, Feb. 1986.
Technical White Paper, "Open TV™ Operating Environment," (© 1998 OpenTV Inc.), pp. 1-12.
*Transcript of the Deposition of John Roop*, Oct. 1996, pp. 186-187.
*Trial testimony of Michael Axford, Prevue Interactive, Inc. and United Video Satellite Group, Inc.* v. *Starsight Telecast, Inc.*, May 9, 1998, pp. 186-187, 295-315, and 352-357.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "*VideoGuide User's Manual*," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.

\* cited by examiner

SYSTEMS AND METHODS FOR PROVIDING AN INTERFACE FOR DATA DRIVEN MEDIA PLACEMENT

CROSS-REFERENCE TO RELATED APPLICATION

This application claims the benefit of priority of U.S. Provisional Patent Application No. 61/750,809, filed Jan. 10, 2013, which is hereby incorporated by reference herein in its entirety.

BACKGROUND

The placement of advertisements and promotions have traditionally relied on extrapolation of a small data panel of viewing behavior and other demographic information from research companies, such as the Nielsen Company, to inform these placements. These panels are limited to robustly measuring the exposure of fairly wide, mostly demographically-based audience targets, such as "women age 25-54", and reporting is generally limited to an aggregate metric for each program aired or the commercial minutes aired within a program.

Planning and placing TV advertising using these metrics alone, however, introduces significant inefficiencies into the placement process. In general, advertisers have a narrower, more specific target than the wide demographic measure produced by data panels. For example, a health cereal manufacturer may be more interested in reaching "women who are health conscious shoppers" instead of "women age 25-54", but present systems are unable to distinguish between these two groups, or at least narrow the scope of the broader demographic. In addition, advertisers establish reach and frequency targets for their advertising campaigns, but current metrics and systems are unable to distinguish which viewers the advertisements are being delivered to in each advertising placement, and thus many spot placements are simply wasted by exposing viewers who have already seen the advertisement many times while other viewers, who are part of the target, go unexposed. Such methods further lack comprehensive placement and optimization algorithms to help advertisers choose available advertising slots to more effectively reach their target audiences.

SUMMARY

These and other objects are accomplished in accordance with the principles of the present invention by providing an interface for developing and optimizing a media placement plan for an advertising campaign.

In some embodiments, an audience management system allows a user to select advertising slots in an advertising campaign. The audience management system generates a plurality of cells for display in a grid arrangement in at least two dimensions. In some embodiments, a plurality of cells may be generated for display in a three-dimensional arrangement. Each of the plurality of cells is associated with an advertising slot corresponding to a content source, time period, particular program, and/or a type of programming. For example, the content source may be a television channel and the time period may be a time of day for which the advertisement is to be aired. Each of the plurality of cells also includes a representation of an audience of the associated advertising slot. For example, the representation of the audience may be an audience composition, an audience size, a projected number of audience impressions, or any combination thereof.

In some embodiments, the audience management system may identify a first cell, for example, by selecting cells. For example, the audience management system may receive a user selection of a first cell of the plurality of cells. In some embodiments, the audience management system may automatically select cells, for example, in response to running an optimization algorithm. The cells may be selected by the system to show the user which advertising slots are recommended for the media plan. The audience management system may be implemented on a user device as an interactive interface application for which the user can input various selections and choose various functions to perform. The functions may include adding a cell to a media plan, removing a cell from a media plan, retrieving more information related to an associated advertising slot, updating audience-related information contained in the cell, assigning a weight value to the first cell, or any suitable combination thereof. The audience management system may execute a function with respect to a first advertising slot associated with the first cell.

In some embodiments, the user may select a content source or a time period. In response, the audience management system may identify a subset of the plurality of cells corresponding to the selected content source or time period, and the subset may include the first cell. A function is then executed on the subset of cells. For example, the function may update a weight value related to an associated advertising slot of each cell in the subset. The weight value may be user-specified, and may relate to a relative importance of the advertising slots to an advertiser or user of the system such that, should a placement function be executed, the placement function takes the weight value into account when optimizing the media plan.

In some embodiments, the audience management system may implement a placement function to recommend advertising slots for an advertising campaign. For example, the system may receive a user selection of a budget value, which may correspond to a fixed budget for the advertising campaign. The audience management system may then allocate the budget value in one or more ways. For example, the audience management system may partition the budget value into a first partition value and a second partition value. For example, the audience management system may make the first partition value correspond to 70% of the total budget and make the second partition value correspond to 30% of the total budget. In another example, the audience management system may allocate the budget value based by various time periods, content providers, programming types, and/or selected advertising universes.

In some embodiments, the audience management system defines a plurality of data structures for storage in memory, in which each data structure may correspond to a particular advertising slot. The system also defines a plurality of groups, and associates each of the plurality of data structures with one of the plurality of groups. For example, the groups may correspond to days in an advertising campaign, and each of the plurality of data structures may represent an advertising slot for a particular day. The audience management system then allocates a portion of the first partition value to each of the plurality of groups. For example, if the first partition value corresponds to 70% of the total budget, the audience management system may allocate that each day receives a portion of the 70%. In some embodiments, each day will receive an equal allocation of the 70% (e.g. for a seven-day advertising plan, each day receives 10% of the total budget).

In some embodiments, the audience management system flags, for each of the plurality of groups, at least one data structure associated with the group based on the portion of the first partition value allocated to the group. For example, the audience management system may identify a list of advertising slots for a particular day of the week that should be added to the media plan, as long as the list of advertising slots does not exceed the allocated budget for that day. In some embodiments, each data structure associated with a particular group is ranked by the audience management system based on audience-related criteria, including audience composition, audience size, audience index, impressions, user-specified weight, campaign goals and parameters, such as total impressions, budget constraints, inventory restrictions, reach, frequency, or any suitable combination thereof. A plurality of ranked data structures may be identified by the audience management system, in which each of the plurality has the highest rankings of the data structures associated with a particular group. The audience management system may then flag the identified data structures. For example, the audience management system ranks each advertising slot for a particular day, and then purchases the most highly ranked advertising slots until the budget allocated for that day is reached. The audience management system performs this selection for each day in the advertising campaign.

In some embodiments, the audience management system identifies a remainder of data structures within the plurality of data structures that are unflagged regardless of the group that the data structures are associated with. For example, the audience management system will search through all available advertising slots through each day of the advertising campaign to identify advertising slots that were not purchased. The audience management system will then rank each advertising slot based on an audience-related criteria, and purchase the highest ranked advertising slots as long as the second budget portion (e.g. 30% of the total budget) is not exceeded.

In some embodiments, the audience management system allows a user to set prices for individual advertising slots or for pricing tiers of groups of advertising slots. The audience management system defines a plurality of data structures and stores the data structures in a memory. Each data structure is representative of one of a plurality of advertising slots. The audience management system then stores, in each of the plurality of data structures, a price value associated with a respective advertising slot. For example, the audience management system may receive pricing information for advertising slots from various publishers, service providers, and content sources.

In some embodiments, the audience management system receives a user selection of a fixed price value. The fixed price value is then stored as the fixed price value of a first data structure of the plurality of data structures. For example, the user may designate a particular advertising slot to have a fixed price. The audience management system then automatically updates the fixed price value of each of the plurality of data structures without changing the fixed price value of the first data structure. For example, once the price is fixed for a first advertising slot, the audience management system may update the pricing information associated with a remainder of the advertising slots based on a projected demand of each of the remainder of the advertising slots. In some embodiments, the projected demand may be based on the fixed price (e.g. setting a high fixed price may be predicted to increase the demand of "nearby" advertising slots on the same television channel). The audience management system may determine projected demand by analyzing historical inventory data, projected inventory data, current demand, audience estimates, or any suitable combination thereof.

In some embodiments, the audience management system may allow the user to set a fixed price for a pricing tier. Pricing tiers may be used to set the prices of a plurality of advertising slots belonging to a particular group associated with the pricing tier. Once the user sets the fixed price for the pricing tier, the audience management system may update a fixed price value for each of the plurality of pricing tiers without changing the fixed price value of the fixed pricing tier. The audience management system then updates each price value of the plurality of advertising slots based on an updated price value of an associated pricing tier.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
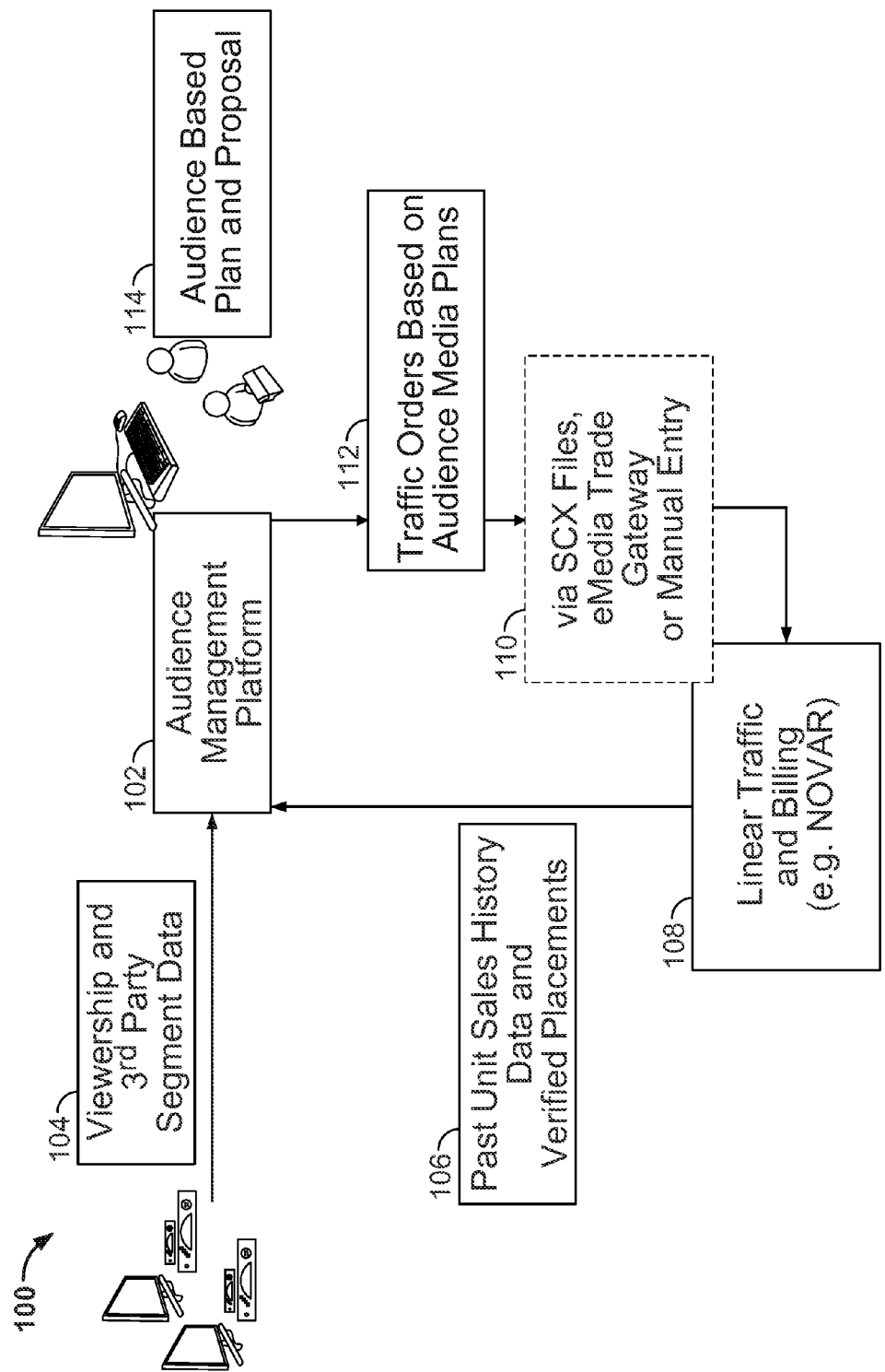
FIG. 1 shows a high level block diagram of an audience management system in accordance with some embodiments of the disclosure.

Over the course of the last two decades, the amount and variety of large data sets has grown exponentially and will only continue to grow. As additional data has become available, this data has been used to inform media placement on a largely ad hoc basis through the use of research reports to manually place advertisements. The systems and methods described herein relate to a platform that enables optimization of media placement (which may also be referred to as "advertisement placement", "ad placement", or "spot ad placement") through coupling of media activation with audience based analytics and targeting that are now possible with large scale datasets and scaled computing resources.

While TV remains a medium where a single advertising spot is seen by somewhere between a few hundred up to millions of people, a different subset of the population is exposed by each spot ad placement. The systems and methods described herein use granular data to understand the members of this subset and the overlap of each subset with each other, enabling the selection of advertisement and promotional placements that most efficiently meet an advertiser's goals. Moreover, the systems and methods described herein are applicable to other embodiments (e.g. online embodiments) aside form television. The system, referred to herein as an "audience management system", provides a common platform that can ingest data from multiple sources (e.g. panels, set-tops, SmartTVs, etc.), generate future estimates of delivery for ad inventory using these data sources, and enable the delivery of media weight as measured by one or more of these data sources. The system utilizes an optimization algorithm that serves to optimize the delivery of one or more of these metrics, depending on the user's inputs and selections in building the media plan.

The system provides an inventory owner with the ability to build an optimized media plan based on a specific target for the advertiser. Using targeting segments matched to set-top or other viewership data at a viewer, household, or other viewing group level, the system will assemble an optimized media plan to reach the advertiser's target at the desired frequency, going beyond traditional age/sex demographics which are primarily used to plan and drive ad placement today.

Once an audience media plan has been generated by the system and approved by an advertiser, the system will create linear traffic orders to execute the media plan. As these traffic orders are executed, the system will update placements to ensure that the media plan delivers on the contracted commitments to the advertiser.

The system further enables the inventory owner to evaluate the inventory usage, pricing, and sellout rates for their existing linear business and establish rules which define inventory availability and pricing policies for sales through the system. As referred to herein, the term "inventory" refers to any available medium through which an advertiser can have an advertisement made available to an audience for a period of time (e.g. a television advertisement slot, a billboard, a magazine, or any other suitable medium). The system optimizes the use of inventory across all of the active media plans, enabling a publisher or other inventory owner to sell audience targeting commitments to many advertisers on an optimized basis. For example, the embodiments disclosed herein may also be applied to multiple media plans and advertiser criteria. In such cases, the audience management system may allocate amongst all advertisers in a responsive manner in order to provide user feedback related to recommended media plans. In each embodiment, the audience management system may rank available inventory based on whether it is more suitable for one advertising campaign over another, and may optimize the allocation so as to avoid an unbalanced distribution of inventory among advertisers.

The foregoing will be apparent from the following description of example embodiments and implementations, as illustrated in the accompanying drawings in which like reference characters refer to the same parts throughout the different views. The drawings are illustrative of the systems and methods described herein and are not to be interpreted as limiting.

FIG. 1 shows a high level diagram of an audience management system in accordance with some embodiments of the disclosure. System 100 includes audience management platform 102, which is implemented on a user equipment device or a server, as will be discussed further with regard to FIGS. 3 and 4. Audience management platform 102 ingests viewership and third party segmentation data received from viewership data source 104, which includes second-by-second or similarly granular viewership data from all available viewers, segmentation targeting data matched against such viewership data and/or additional processed viewership panel metrics from providers such as Nielsen or Rentrak, to build a model of available audience impressions and behavior. Sales history source 106 provides a feed or batched transfer of sales history from the inventory owner's traffic system that is transferred to audience management platform 102, and may include data on each unit sold, the unit price, advertiser and relevant categories or rate codes, and present inventory availability levels. These inputs are used to project sellout rates and cost-per-thousand impressions (CPMs) for present and future inventory blocks. Using this data received from sales history source 106, combined with set-top impression and targeting data received from viewership data source 102, audience management platform 102 allows a user to manage and optimize which blocks of inventory are available for audience sales and set pricing. These functions can help the inventory increase revenue by maximizing yield between traditional linear sales models and the present invention's data driven media placement model.

Using console 114, which can be a web-based console or other interface that enables access to audience management platform 102, users can create an optimized media plan based on an input that can include the advertiser's desired target (typically defined by one or more attributes from a third party data source and/or a viewership or other behavior), impression delivery goals, reach to target audience, budget constraints, and a media plan external to the systems. Once a proposal has been approved by the inventory owner, the advertiser, or user of the system, audience management platform 102 generates traffic orders using traffic order module 112 to process through media traffic system 108 via data path 110. For example, traffic system 108 may be the inventory owner's media traffic system (e.g. the NOVAR system). With multiple advertisers in the system, traffic order module 112 will optimize across advertisers and produce traffic orders that maximize revenue or such other parameters dictated by the system user (e.g., sell out rates, breadth of media plan across multiple networks, etc.). As an advertiser's order is executed and media is placed, the verified results are picked up by the system through the data transfer discussed in regard to sales history source 106. The system will then adjust future order output to complete the contracted audience delivery for the advertiser.

System 100 may receive inputs from a user through console 114 using a suitable interactive interface application, which may take various forms depending on the options provided to a user of console 114. Interactive interface applications may generate graphical user interface screens that enable a user to navigate among, locate, and select various options such inventory selections, weighting values, price setting, and optimization settings used in conjunction with data driven media placement. As referred to herein, the terms "media content" and "media" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same.

The interactive interface applications and/or any instructions for performing any of the embodiments described herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the phrase "user equipment device," "user equipment," "user device," "electronic device," "electronic equipment," "media equipment device," or "media device" should be understood to mean any device for accessing, viewing, selecting options, or any combination thereof, including, but not limited to, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, or wireless device, and/or combination of the same. It is to be understood that any of the foregoing devices may be used by an advertiser, inventory owner, publisher, or any user of the audience management system to perform the methods or operate the systems described herein.

In some embodiments, the user equipment device may have a front facing screen and a rear facing screen, multiple front screens, or multiple angled screens. In some embodiments, the user equipment device may have a front facing camera and/or a rear facing camera. The user equipment device may be configured to implement an interactive interface application. The interactive interface application may be provided as on-line applications (i.e., provided on a web-site), or as stand-alone applications or clients on user equipment devices. Various devices and platforms that may implement interactive interface applications are described in more detail below.

Figure 2:
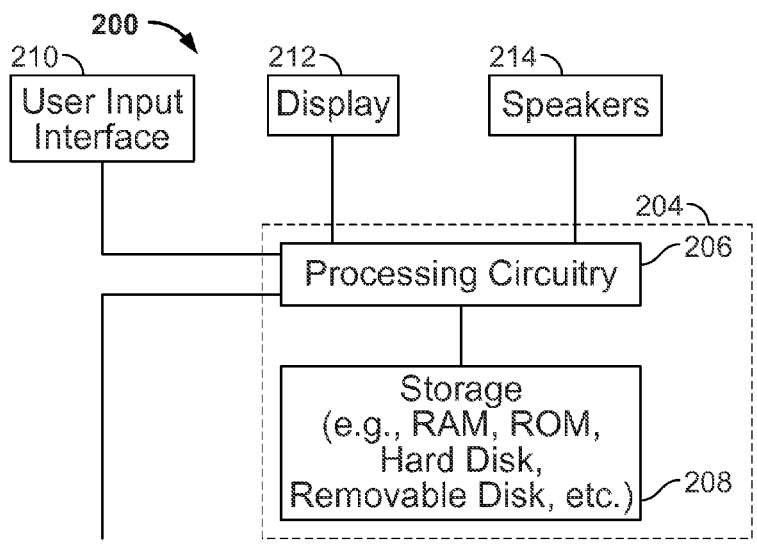
FIG. 2 is a block diagram of an illustrative user equipment device used in accordance with some embodiments of the disclosure.

FIG. 2 is a block diagram of an illustrative user equipment device used in accordance with some embodiments of the disclosure. Users may access content and the interactive interface application (and its display screens described above and below) from one or more of their user equipment devices. A generalized embodiment of illustrative user equipment device 200 is shown in FIG. 2. More specific implementations of user equipment devices in the context of an audience management system are discussed below in connection with FIG. 3. User equipment device 200 may receive content and data via input/output (hereinafter "I/O") path 202. I/O path 202 may provide content (e.g., broadcast programming, on-demand programming, Internet content, content available over a local area network (LAN) or wide area network (WAN), and/or other content) and data to control circuitry 204, which includes processing circuitry 206 and storage 208. Control circuitry 204 may be used to send and receive commands, requests, and other suitable data using I/O path 202. I/O path 302 may connect control circuitry 204 (and specifically processing circuitry 206) to one or more communications paths (described below). I/O functions may be provided by one or more of these communications paths, but are shown as a single path in FIG. 3 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Any component described herein that is used in the audience management system (e.g. user television equipment, a PC, a laptop, wireless portable devices, a media content server, a media guidance server, a user profile server, an audience management module, etc.), may have its own control circuitry 204 and processing circuitry 206. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for a interactive interface application stored in memory (i.e., storage 208). Specifically, control circuitry 204 may be instructed by the interactive interface application to perform the functions discussed above and below. For example, the interactive interface application may provide instructions to control circuitry 204 to generate the media guidance displays. In some implementations, any action performed by control circuitry 204 may be based on instructions received from the interactive interface application.

In client-server based embodiments, control circuitry 204 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance information, described above, and guidance application data, described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for upconverting and downconverting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touch screen, touchpad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images. In some embodiments, display 212 may be HDTV-capable. In some embodiments, display 212 may be a 3D display, and the interactive interface application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of user equipment device 200 or may be stand-alone units. The audio component of videos and other content displayed on display 212 may be played through speakers 214. In some embodiments, the audio may be distributed to a receiver (not shown), which processes and outputs the audio via speakers 214.

The guidance application may be implemented using any suitable architecture. For example, it may be a stand-alone application wholly implemented on user equipment device 200. In such an approach, instructions of the application are stored locally, and data for use by the application is downloaded on a periodic basis (e.g., from an out-of-band feed, from an Internet resource, or using another suitable approach). In some embodiments, the interactive interface application is a client-server based application. Data for use by a thick or thin client implemented on user equipment device 200 is retrieved on-demand by issuing requests to a server remote to the user equipment device 200. In one example of a client-server based guidance application, control circuitry 204 runs a web browser that interprets web pages provided by a remote server.

In some embodiments, the interactive interface application is downloaded and interpreted or otherwise run by an interpreter or virtual machine (run by control circuitry 204). In some embodiments, the guidance application may be encoded in the ETV Binary Interchange Format (EBIF), received by control circuitry 204 as part of a suitable feed, and interpreted by a user agent running on control circuitry 204. For example, the guidance application may be an EBIF application. In some embodiments, the guidance application may be defined by a series of JAVA-based files that are received and run by a local virtual machine or other suitable middleware executed by control circuitry 204. In some of such embodiments (e.g., those employing MPEG-2 or other digital media encoding schemes), the guidance application may be, for example, encoded and transmitted in an MPEG-2 object carousel with the MPEG audio and video packets of a program.

Figure 3:
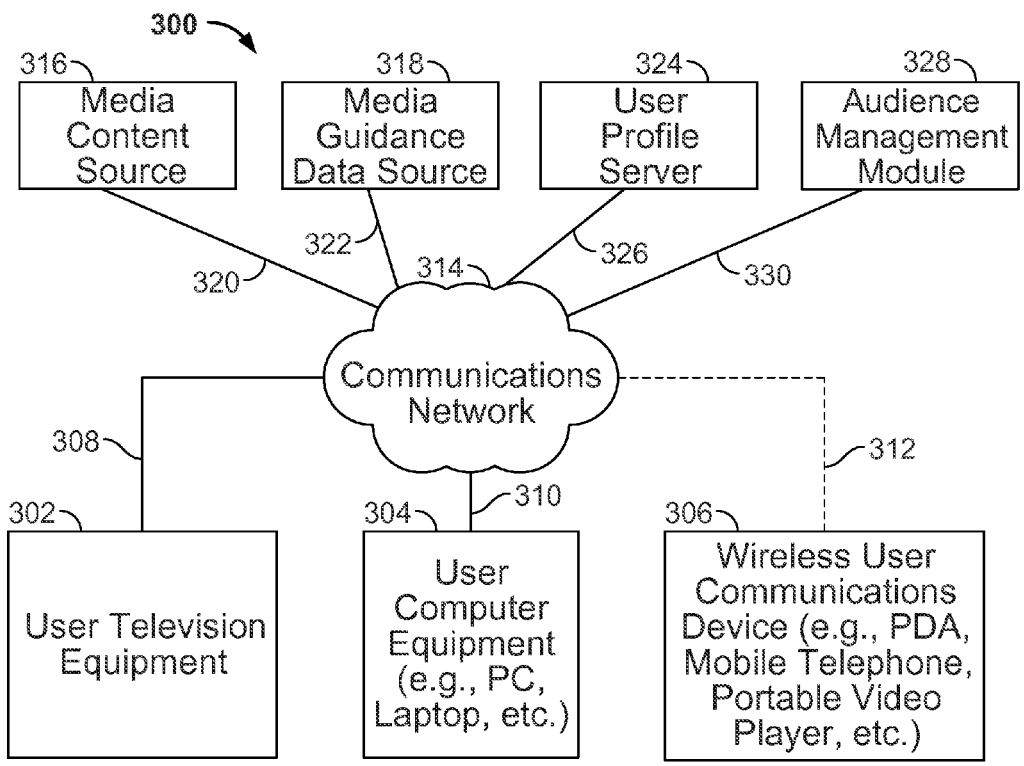
FIG. 3 is a block diagram of an illustrative device network for an audience management system in accordance with some embodiments of the disclosure.

FIG. 3 is a block diagram of an illustrative device network for an audience management system in accordance with some embodiments of the disclosure. User equipment device 200 of FIG. 2 can be implemented in audience management system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which an interactive interface application may be implemented, may function as a standalone device or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The interactive interface application may have the same layout on various different types of user equipment or may be tailored to the display capabilities of the user equipment. For example, on user computer equipment 304, the guidance application may be provided as a web site accessed by a web browser. In another example, the guidance application may be scaled down for wireless user communications devices 306.

In audience management system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent interactive interface application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths, but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 314.

Audience management system 300 includes content source 316 and media guidance data source 318 coupled to communications network 314 via communication paths 320 and 322, respectively. Paths 320 and 322 may include any of the communication paths described above in connection with paths 308, 310, and 312. Communications with the content source 316 and media guidance data source 318 may be exchanged over one or more communications paths, but are shown as a single path in FIG. 3 to avoid overcomplicating the drawing. Content source 316 may be any type of media content provider or service provider, and be capable of providing media recommendations to any user equipment device over communications network 314. In addition, there may be more than one of each of content source 316 and media guidance data source 318, but only one of each is shown in FIG. 3 to avoid overcomplicating the drawing. (The different types of each of these sources are discussed below.)

If desired, content source 316 and media guidance data source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or may not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S.

Pat. No. 7,761,892, issued Jul. 20, 2010, which is hereby incorporated by reference herein in its entirety.

Media guidance data source 418 may provide media guidance data, such as the media guidance data described above. Interactive interface application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 318 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 318 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 318 may provide user equipment devices 302, 304, and 306 the interactive interface application itself or software updates for the interactive interface application.

User profile information including user settings, user personalization, user preference, and user media content information may be stored on user equipment devices and/or on user profile server 324. User profile server 324 may be in communication with user equipment devices 302, 304 and 306 through communications path 326 and communications network 314. User profile server 324 may include storage devices for storing user profile information associated with user media networks. User profile server 324 may also include storage devices for storing media content information associated with user media networks including recordings of media content and/or lists of selected media content. User profile server 324 may include processors and communications circuits for managing user profile information, remotely controlling and communicating with user equipment devices, and exchanging user profile information with user equipment devices. Media content source 316 may communicate with user profile service 324 to obtain information on a particular user to which media recommendations may be sent, or may have its own user profile server for maintaining user profile information.

Interactive interface applications may be, for example, stand-alone applications implemented on user equipment devices. For example, the interactive interface application may be implemented as software or a set of executable instructions which may be stored in storage 208, and executed by control circuitry 204 of user equipment device 200. In some embodiments, interactive interface applications may be client-server applications where only a client application resides on the user equipment device, and server application resides on a remote server. For example, interactive interface applications may be implemented partially as a client application on control circuitry 204 of user equipment device 200 and partially on a remote server as a server application (e.g., media guidance data source 318) running on control circuitry of the remote server. When executed by control circuitry of the remote server (such as media guidance data source 318), the interactive interface application may instruct the control circuitry to generate the guidance application displays and transmit the generated displays to the user equipment devices. The server application may instruct the control circuitry of the media guidance data source 318 to transmit data for storage on the user equipment. The client application may instruct control circuitry of the receiving user equipment to generate the guidance application displays.

Content and/or media guidance data delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute interactive interface applications (e.g., web-based applications or cloud-based applications), or the content can be displayed by interactive interface applications stored on the user equipment device.

Audience management system 300 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 3.

In one approach, user equipment devices may communicate with each other within a home network. User equipment devices can communicate with each other directly via short-range point-to-point communication schemes described above, via indirect paths through a hub or other similar device provided on a home network, or via communications network 314. Each of the multiple individuals in a single home may operate different user equipment devices on the home network. As a result, it may be desirable for various media guidance information or settings to be communicated between the different user equipment devices. For example, it may be desirable for users to maintain consistent interactive interface application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a interactive interface application implemented on a remote device. For example, users may access an online interactive interface application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a interactive interface application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their interactive interface application to communicate directly with content source 316 to access content. Specifically, within a home, users of user television equipment 302 and user computer equipment 304 may access the interactive interface application to navigate among and locate desirable content. Users may also access the interactive interface application outside of the home using wireless user communications devices 306 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more media guidance data sources 318. In addition or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 304 or wireless user communications device 306 having content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, a interactive interface application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 4:
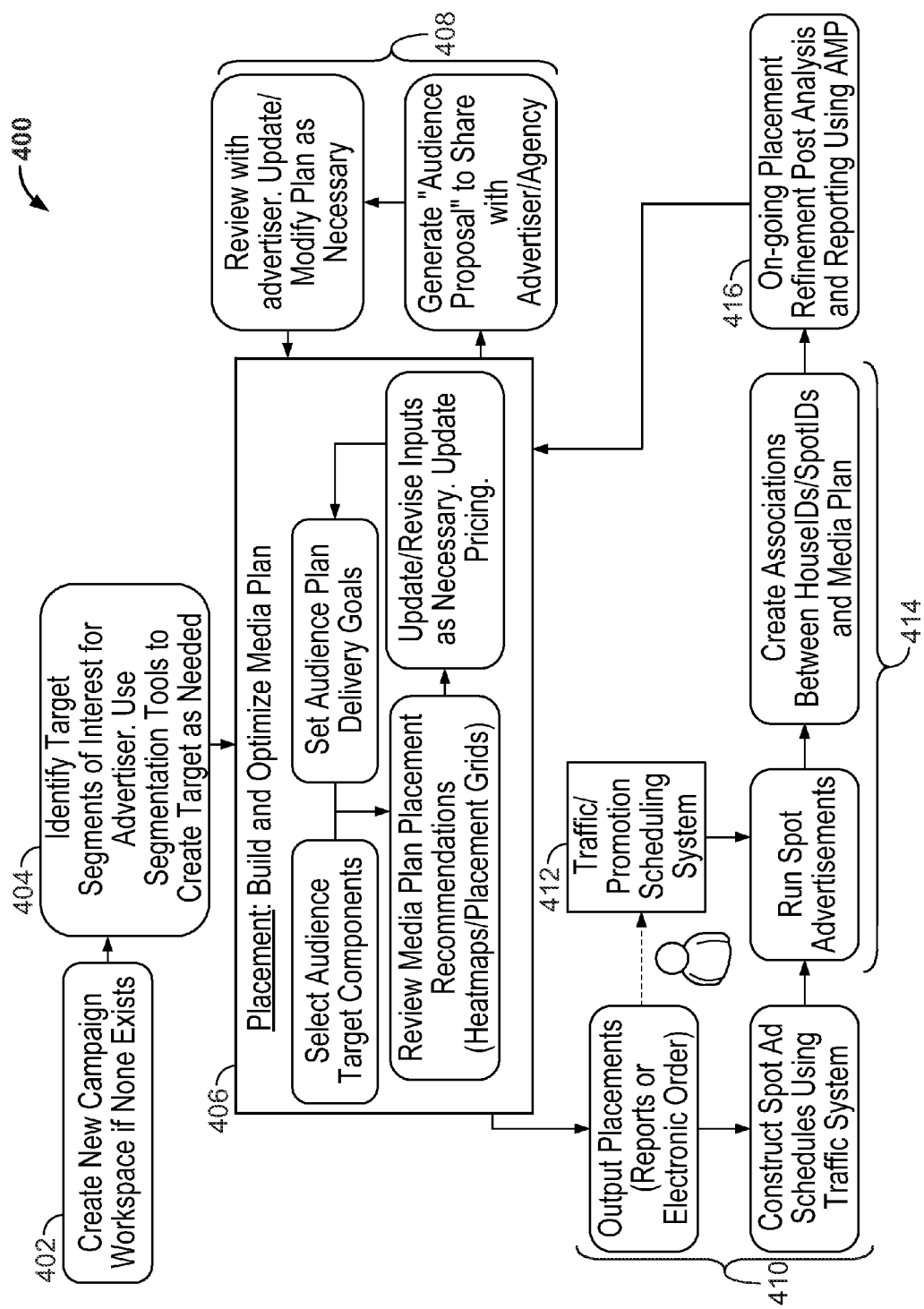
FIG. 4 is a block diagram illustrating a workflow process in building a data driven media plan in accordance with some embodiments of the disclosure.

FIG. 4 is a diagram illustrating a workflow process in building a data driven media plan in accordance with some embodiments of the disclosure. Workflow process 400 illustrates the perspective of a user of audience management system 300 in building a data driven media placement plan. When creating a media plan for a new advertiser or campaign, the user can first create a new account and/or campaign for that advertiser at step 402. In some embodiments, the user may operate audience management module 328 using an interactive interface application on user equipment device 200, which receives inputs via user input interface 310. In some embodiments, audience management module 328 may be operated from any other suitable user equipment device located remotely that communicates with audience management module 328 through communications network 314, for example, a device using a web interface. The user may be, for example, an advertiser, an inventory owner, or a third party acting on behalf of the advertiser.

Once the account is created, the process proceeds to step 404. At step 404, the user identifies a target segment to be used for the media plan that identifies a group of viewers or households with certain characteristics to be targeted through the system. These may include specific target segments created by third parties available to audience management system 300 and matched with the viewership data or behavioral segments accessible through audience management system 300 or created by the user. For example, a media content source, such as NBC, may be able to provide a pre-defined target segment, such as "has viewed Saturday Night Live 3 times in the last 6 months", to the user. In some embodiments, audience management module 328 may query media content source 316 to retrieve a list of pre-defined target segments based on viewership data. In some embodiments, audience management module 328 may query user profile server 324 to retrieve viewership data to enable the user to produce his/her own target segments. In addition, unions or intersections of existing targets may be defined as new targets using a target creation function of the audience management module 328.

Once the user has established one or more target segments that he/she would like to reach in the advertising campaign, the process may then proceed to step 406. In step 406, the user may utilize placement functions of audience management module 328 that enable the user to build an optimized media plan to reach the earlier established target segments established. The term "placement" should be understood to mean the adding or allocation of inventory, such as in the form of available advertising slots, to an advertising campaign of an advertiser, such that advertising media is made available to an audience within a scheduled time period upon execution of the advertising campaign. In some embodiments, placement functions may relate setting campaign goals and parameters, such as total impressions, budget constraints, inventory restrictions, reach, frequency, or any suitable combination thereof, as will be described in greater detail with respect to FIGS. 13 and 14. In some embodiments, step 328 may be an iterative process performed by processing circuitry 206 of advertising management module 328. For example, the placement function, as performed by audience management module 328, may change or optimize media placements for a given plan based on modifications made or weighted parameters set by the user to the campaigns goals and parameters, as will be discussed in greater detail with respect to FIGS. 13 and 14. The user may review the media plan placement and decide that advertising on or with a particular content source (e.g. a website or television channel) may be more effective than others, and then assign or re-assign a relatively high weight value to that channel. Once the user's changes have been entered, the placement process may repeat based on these changes until the user indicates that he/she is satisfied with the placement results.

Once a media plan is created by the placement function and approved by the user, the process then proceeds to step 408. Step 408 may be optionally performed in the scenario in which the user is not the advertiser, but is acting on behalf of the advertiser. At step 408, the user will be able to generate a proposal to share with the advertiser. Proposals are formatted reports that provide a summary of the goals and media being delivered for the campaign, and may be transferred to a device of the advertiser over communications network 314. If the advertiser requests changes to the proposal/campaign, the placement function will allow the user to make updates to the campaign parameters, save a new version and generate a new proposal. In some embodiments, the user may authorize access to the advertiser to edit the parameters of the media plan directly, for example, through a web interface. In some embodiments, the proposal may be in the form of an interactive interface application implemented on a user equipment device of the advertiser. For example, the advertiser may be able to view the parameters and proposed media plan in the interactive interface application. In some embodiments, the advertiser may propose changes to the parameters of the proposed media plan, and simulate the placement function in order to see how the advertiser's proposed changes affect the media plan.

If the advertiser and/or user are satisfied with the media plan projections made using the placement function, the user may then save the current state of the media plan and proposal, for example, by storing the media plan and proposal in storage 208 of audience management module 328. The process proceeds to step 410. At step 410, audience management module 328 generates a specific set of advertisement placements in accordance with available advertising slots, or spots, for particular content providers. These placements are based on the optimization parameters discussed in connection with the various embodiments disclosed herein. In some embodiments, the placement may require a specific time to run the advertisement. In some embodiments, the placement may designate a time period for running the advertisement, and a "fuzzy" schedule may be generated in which the advertisement is required to appear within the time period, but at a specific time designated by the content source that runs the advertisement. Concurrently with step 410, or alternatively, the order may be transferred to and ingested by a traffic/promotion scheduling system in step 412.

The process proceeds to step 414. At step 414, media placements for the advertiser are executed via the traffic system and ad inserters as the advertisement is placed. The process then proceeds to step 416, where the verified placements are fed back into the system via verification or as-run logs. Using this data and collected viewership data, audience management module 328 can update estimates of audience for the placements with actual verified impression delivery, and will update future placements based on performance to-date. Audience management module 328 then provides the user with the ability to generate reports on actual delivery metrics based on verified spot placements against impressions calculated from set-top impressions, as accessible through communications network 314.

Figure 5:
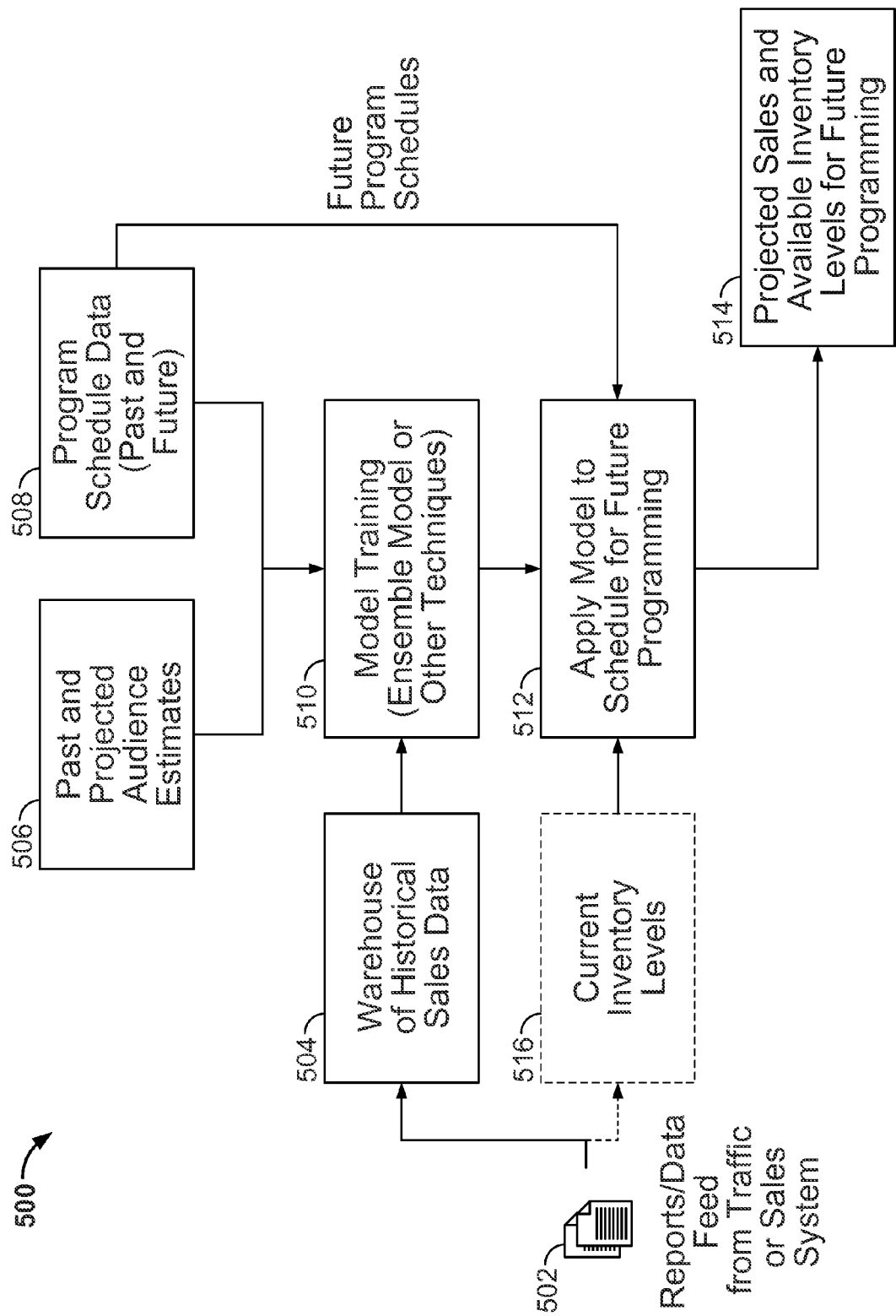
FIG. 5 is a diagram illustrating how available inventory is projected in accordance with some embodiments of the disclosure.

FIG. 5 is a diagram illustrating how available inventory is projected in accordance with some embodiments of the disclosure. System 500 may be a subsystem implemented within communications network 314. Data on past sales from the inventory owner's traffic system is received from traffic/sales system 502, and is ingested and stored in database 504 to create a warehouse of past sales data for analysis. Historical data on unit sales, past and projected audience estimates from database 506, and program schedule data from database 508 are transferred to module 510 and are used with machine learning techniques to generate a predictive model for future sales. In some embodiments, the model is designed to estimate the number of units of inventory (e.g. individual advertising slots) to be sold at each rate or rate code for future time periods. Sales estimates can be modeled at various grouping levels for a specific program, a time period (e.g. an hour or daypart), and a content source for a given time period, and unit sales are analyzed for each content source and zone covered by the system. Once a model has been trained, the model is utilized by module 512 with inputs from future programming schedules and future audience estimates to project inventory sold and available, which is stored in database 514. In some embodiments, current inventory levels for the future are extracted from the data received from traffic/sales system 502 and optionally stored in database 516 and may be used by module 512 to generate more accurate projections. The model is periodically re-trained and new estimates of inventory availability are generated as necessary. Projections created from the model enable tier analysis and media planning with audience management system 400.

In some embodiments, viewing data, which has been edited to remove viewing attributed to TV-off events or other boundary parameters, is aggregated by audience management module 328 into blocks bounded by the start and end times of the programming being aired. A set of data for training the model is extracted from a superset of all edited viewing data. This extracted data will include as much data as can be feasibly processed by the model. In some embodiments, this extracted data is at least a year's worth of data in order to include seasonal effects on viewership, although the system can operate effectively with less data. Using the extracted data, machine learning algorithms are applied to generate a predictive model which uses the various attributes associated with relevant programming (e.g., start time, day of week, genre, keyword, local interest, lead-in status of the program, etc.) to predict the average audience (average number of viewers) and total reach (total unique viewers for that program over a period of time) for each programming block. For example, in some embodiments, the audience management system may receive one or more inputs for use in estimating data associated with future audience inventory for media plans. In some embodiments, the received inputs may be used in conjunction with data retrieved from other various sources, such as databases 604, 606, 652, and 654, as described below with respect to FIGS. 6A and 6B.

Figure 6A:
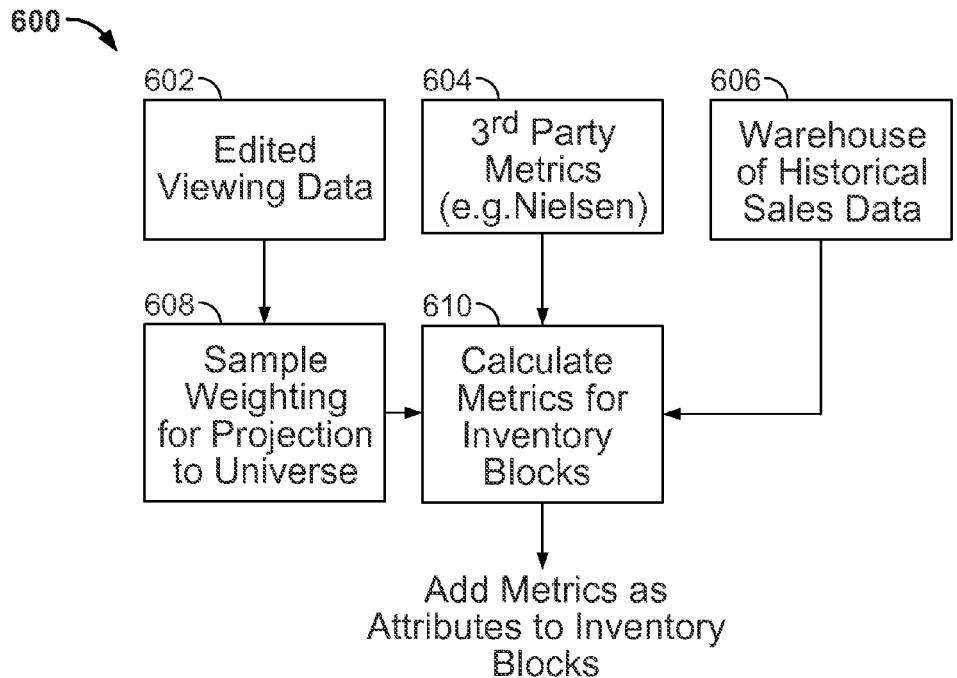
FIGS. 6A and 6B are diagrams illustrating how metrics are determined for inventory blocks for a media plan in accordance with some embodiments of the disclosure.
Figure 6B:
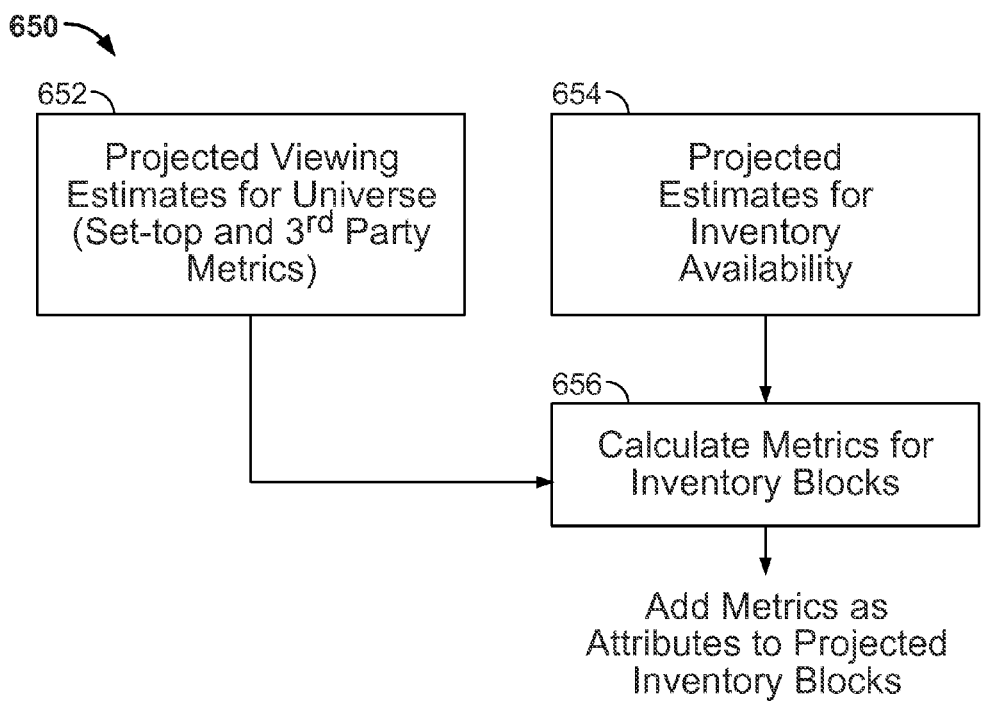

FIGS. 6A and 6B are diagrams illustrating how metrics are determined for inventory blocks for a media plan in accordance with some embodiments of the disclosure. Inventory analysis is conducted by aggregating inventory into blocks, where each block represents a particular future program, hour of the day, or daypart for a particular content source. Processes 600 and 650 calculate metrics for each block available and projected inventory, respectively, and add the metrics as attributes to those blocks of inventory so that they can be evaluated against rules created by the user downstream.

In some embodiments, currently available inventory blocks are evaluated by pulling data from various databases, including viewership database 602 (which is filtered through module 608 to generate a universe projection), third party metrics database 604, and sales database 606 feed data to module 610. In some embodiments, projected inventory blocks are evaluated by pulling data from third party database 652 (in which universe estimates may be generated by a third party) and inventory database 654 (in which projected estimates for inventory availability are maintained) feed data to module 656. Depending on the scope of the inventory, the audience estimates used for metric calculations may be different. For example, spot (unit) inventory from an individual zone will require universe projections, and future estimates based on the population of that zone. Spot (unit) inventory from an interconnect will require universe projections for the entire interconnect, while national inventory will require universe projections for the total carriage of the channel. In some embodiments, inventory analysis performed by audience management module 328. In some embodiments, the metrics are computed via a third part and transmitted to audience management module 328 over communications network 314.

Once the metrics are determined and audience information has been suitably processed, audience management system 300 may provide a visual interface (e.g. a media plan interface) to allow easily design and edit a media plan.

Figure 7:
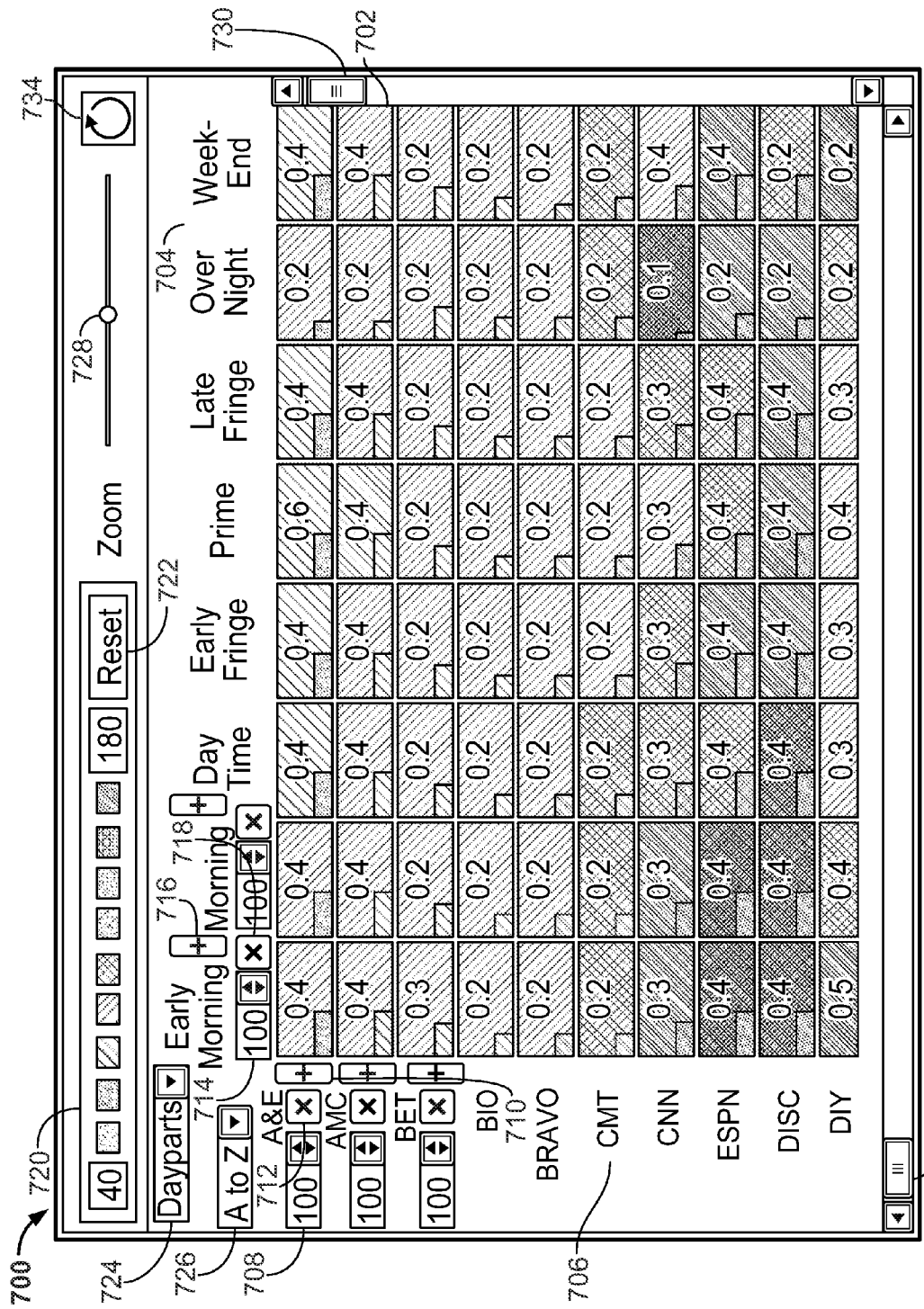
FIG. 7 shows an illustrative media plan interface in accordance with some embodiments of the disclosure.

FIG. 7 shows an illustrative media plan interface in accordance with some embodiments of the disclosure. The media plan interface may be presented to a user in the form of display 700, which corresponds to an interactive interface application implemented on user equipment device 200 using processing circuitry 206. The media plan interface allows the user to input parameters remotely, using user input interface 210, which are then transmitted to audience management module 328 over communications network 314. In some embodiments, audience management module 328 may be implemented locally on user equipment device 200, for example, the media plan is being generated by a user at an advertising service provider on behalf of an advertiser. Data relating to content sources, time periods, inventory, projected inventory, pricing, historical viewership data, audience metrics and analytics provided to audience management module 328 may be generated for display by processing circuitry 206 and appear in display 700.

Grid arrangement 702 contains a plurality of cells representative of a proposed media plan for placement of advertisements. In display 700, each cell contains representative audience data, and each cell may correspond to a particular inventory unit, such as an advertising slot for a content source and a time period, as shown in FIG. 7. The cells may also have binary indicators, such as the presence or absence of a background color, which indicates whether or not an advertising slot associated with the cell is part of the proposed media plan (i.e. advertisement placement is desired/recommended). In some embodiments, the cells are arranged in a grid configuration according to a time period axis 704 and a content source axis 706. In some embodiments, the cells may be arranged according to audience-related parameters, such as projected audience size, projected impressions, audience demographics, or any suitable combination thereof. In some embodiments, a single cell may be generated for display, or a single group of cells corresponding to a particular content source or time period may be displayed. Each element of time period axis 404 may correspond to a time period relevant to the advertising campaign, such as a week, a day, a daypart (such as early morning, morning, daytime, etc., as depicted in display 700), or any other suitable time period relevant to an advertising schedule. Each element of content source axis 406 may correspond to a particular content source, such as a broadcast television channel (such as A&E, AMC, BET, etc., as depicted in display 700), on-demand channel, internet website, or any other suitable content source.

Television advertising is merely illustrative, and the media plan need not be limited to television or other electronic content sources. For example, audience management module 328 may be implemented in the context of advertising in general, such as newspaper, magazine, billboards, posters, or other suitable forms of advertising. In such embodiments, display 700 may display a plurality of cells arranged according to a particular advertising venue and a particular day of the week for which the advertisement is to be run. For example, content source axis 406 may be replaceable by an axis indicative of a printed publication, and time period axis 404 may be indicative of a particular publication month.

In some embodiments, each content source or time period may have an associated weight value. For example, weight options 708 and 714 appear beside a content source and time period, respectively. Processing circuitry 206 may receive user inputs to adjust a weight associated with the content source or time period. In some embodiments, the value of "100" may indicate a default weight. The user has the option of selecting different weights, which may affect a scoring algorithm, as will be discussed in greater detail with respect to FIGS. 13 and 14. Changing a weight value can affect a group of cells associated with the content source or time period for which the weight value is changed. For example, if processing circuitry 206 receives a user input to change a weight value via weight option 708, all advertising slots associated with the channel "A&E" may have their associated weights changed. In some embodiments, the user may manually fix a weight value of a particular cell (advertising slot), which will remain unaffected in response to a user selection of a group-related weight option, such as weight option 708. A user selection of options 712 and 718 may cause weight options 708 and 714, respectively, to disappear from display 700, and may result in the respective weight values reverting back to their default values.

In some embodiments, processing circuitry 206 may receive user selections of options 710 and 716, which provide increased granularity for the content source or time period that each represents. In some embodiments, options 710 and 716 may appear in response to a user selection on a content source of content source axis 706 and a time period of time period axis 704, respectively. For example, a selection of option 710 may cause processing circuitry 206 to generate for display content source related information within the cells in the row corresponding to option 710, such as the programs that will be airing or the availability of advertising slots. In response to a user selection of option 716, for example, processing circuitry 206 may generate for display additional time period related information within the cells in the column corresponding to option 716. Additional time period related information may include additional columns corresponding to the hours within a particular daypart, such as columns representing each of "5 am", "6 am", and "7 am" instead of a single column representing "Early Morning".

If processing circuitry 206 receives a user selection of sort option 726, rows of grid arrangement 702 may be sorted according to a property of the content sources within content source axis 706. For example, content sources may be sorted in forward or reverse alphabetical order, by popularity, by average cost to advertise, by assigned weight values, or by any other suitable quantity.

If processing circuitry 206 receives a user selection of time period option 724, processing circuitry 206 may generate for display a suitable time period representation for time period axis 704. For example, display 700, as depicted in FIG. 7, shows the time periods as dayparts. A user selection of time period option 724 allows the user to select a desired time period format from a plurality of formats. For example, the user may select hours, days, weeks, or define a custom range using user input interface 210.

Density indicator 720 provides an indication to a user of the magnitude or relative value of a visual indicator of an audience-related parameter. For example, density indicator 720, as depicted in FIG. 7, corresponds to a shading within each of the plurality of cells in grid arrangement 702. The shading may correspond to any number of audience-related parameters, such as audience composition, audience index, and projected or actual impressions. For example, in display 700, the shading in each of the plurality of cells corresponds to an audience composition, which may be determined by viewership data provided to or retrieved by audience management module 328. The audience composition may be based on a target audience, as specified by the advertiser for a particular advertising campaign, and the shading may represent to the advertiser a relative ratio or index of how many audience members fall, or are projected to fall, within a particular target segment. In some embodiments, the user may adjust the scale of density indicator 720, or may reset the scale to a default scale by selecting option 722. In response to receiving a user selection of option 722, processing circuitry 206 may determine a suitable range to scale the data, based on audience-related data received from audience management module 328.

A user selection of zoom option 728 may result in a relative increase or decrease in size of elements appearing in display 700, or a relative increase or decrease in granularity of the information appearing in display 700. Zoom option 728 may be implemented in any suitable fashion, such as a slider, buttons of various sizes, a percentage indicator, or any suitable combination thereof. In some embodiments, if the user slides zoom option 728 to the right, this may cause processing circuitry 206 to increase the granularity of the information displayed by, for example, replacing existing time period columns with time period columns corresponding to shorter time periods. A display with increased granularity is discussed in greater detail with respect to FIG. 10. Display 700 may then also display information associated with these shorter time periods, such as available advertising slots in those time periods and relevant audience-related parameters. To navigate to information that is not currently visible, processing circuitry 206 may receive a user selection of scroll options 730 and 732 to scroll the display along content source axis 706 and time period axis 704, respectively. If processing circuitry 206 receives a user selection of refresh option 734, processing circuitry may retrieve updated information from audience management module 328, and update the display 700 with this information as necessary.

In some embodiments, processing circuitry 206 may receive a user selection of a cell of the plurality of cells in grid arrangement 700. Once the cell is selected, the user may take an action suggestive of a particular function to execute with the respective cell. For example, using user input interface 210, the user may select an available option through the interactive interface application implemented on user equipment device 200. The function may be executed locally or remotely. For example, if user equipment device 200 is located remotely from audience management module 328 and the function requires audience management module 328 to perform a placement function, the message may be transmitted, along with any additional required information, from user equipment device 200 to audience management module 328. After executing the function, audience management module 328 may then transmit updated information back to user equipment device 300 that reflects the results of the placement function, and this updated information may then be generated for display by processing circuitry 206. The function executed by processing circuitry 206 may be, for example, adding one or more advertising slots to a media plan, removing one or more advertising slots from media plan, displaying additional information for each cell in the form of pop-up overlay, generating for display media content from a corresponding content source, updating a weight value related to an associated advertising slot of each of the selected cells, updating an audience representation for each of the plurality of cells, transmitting an order to place advertisements, refreshing the display, assigning a fixed price value to an advertising slot, or any other suitable function in accordance with the embodiments described herein.

In some embodiments, functions may be performed locally on user equipment device 300. For example, a weight adjustment function, such as a user selection of option 708, may affect weight values stored locally at user equipment device 300. The weight value, among other parameters, may be transmitted to audience management module 328 as needed, for example, when a placement function is to be performed.

Advertising slots that have been added to or removed from the media plan may be visually distinguishable.

Figure 8:
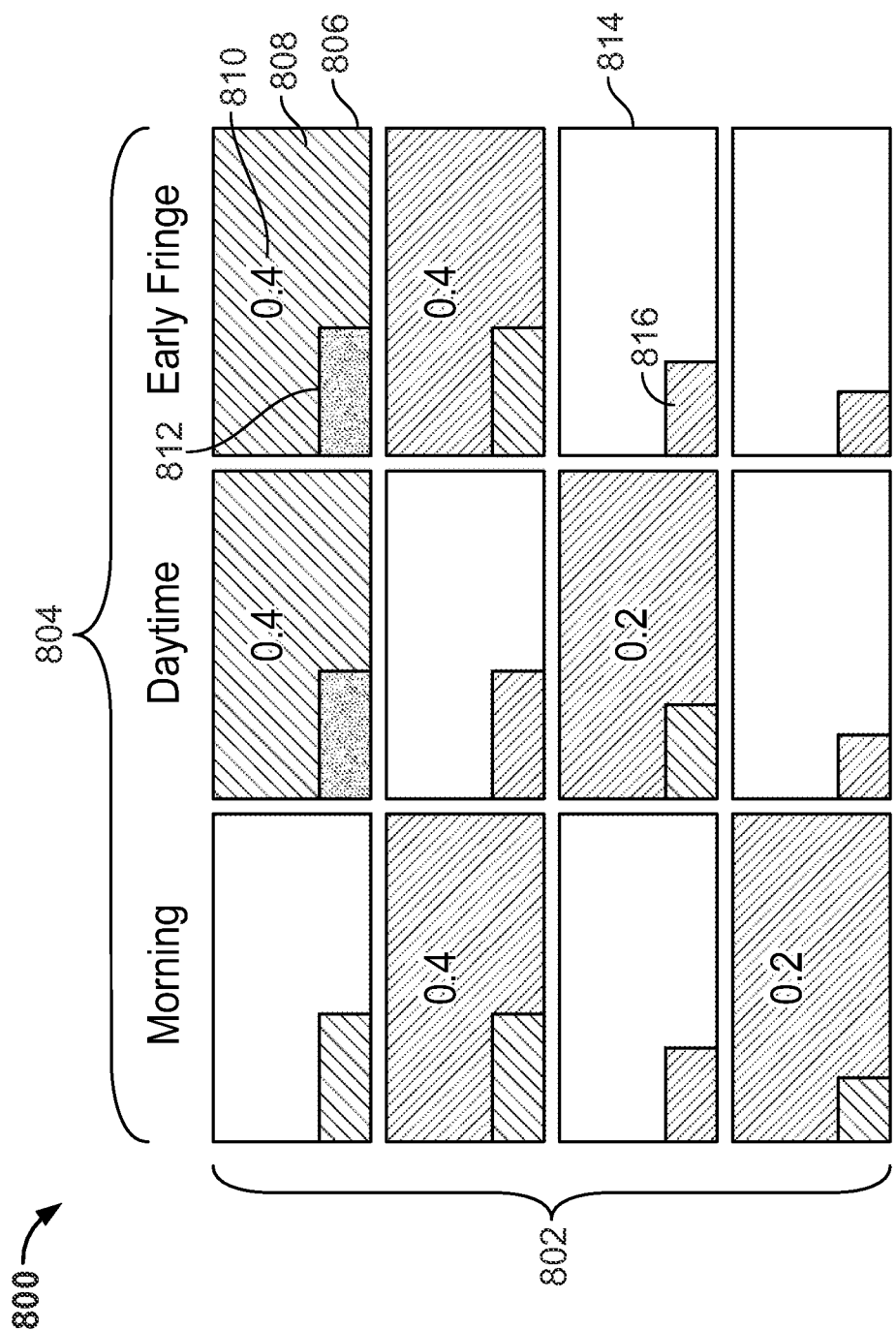
FIG. 8 shows a detailed view of advertising slots for an illustrative media plan interface in accordance with some embodiments of the disclosure.

FIG. 8 shows a detailed view of advertising slots for an illustrative media plan interface in accordance with some embodiments of the disclosure. Similar to display 700 of FIG. 7, FIG. 8 shows reduced display 800, which includes grid arrangement 802 and time period axis 804. Each of the plurality of cells in grid arrangement 802 may correspond to an inventory slot (i.e. available advertising slot).

Cell 806 is representative of an advertising slot that has been added to an advertiser's media plan, or may be part of a proposed media plan for the advertiser. Cell 806 includes background indicator 808, which may be representative of an audience-related parameter, such as audience composition as in display 700. In addition to background indicator 808, bar 812 may also be indicative of the same audience-related parameter as background indicator 808, thereby providing the user with two types of visual indications. Bar 812 may scale the length of the cell 806, with a minimum and maximum bar length corresponding to a minimum and maximum value of the audience-related parameter. For example, the length of the bar may be indicative of a percentage of actual or projected viewers that fall within a target segment (e.g. "Seinfeld fans ages 25-35"). In some embodiments, bar 812 may be indicative of a different value than background indicator 808. For example, bar 812 may be representative of an audience size, in which zero width represents zero audience available, and a maximum width represents 1.65 standard deviations above a mean value of audience sizes represented. Beyond a particular audience size, bar 812 may max out at this value. This may provide an indication to the user that the advertising slot represented by the cell corresponds to a period in which a highly rated program was or will be aired.

Cell 806 also includes index indicator 810, which may be representative of an actual or projected audience-related parameter, such as audience index (which relates to average audience size and variance), impressions, or gross rating points. In general, index indicator 810 may represent any audience-related parameter that is not confined to a range (such as a percentage).

Cell 814 is representative of an advertising slot that has been not been added to, or has been removed from, an advertiser's media plan. When an available advertising slot is manually selected to be part of, or recommended by audience management system 300 to be part of, an advertising campaign, the advertising slot is referred to herein as being "part of the media plan". Unlike cell 806, cell 814 is missing a background indicator and an index indicator. Displaying a cell such that audience-related parameters appear to be missing from the cell may serve as an indication to the user that the advertising slot corresponding to the cell is not part of the media plan. Cell 814 still contains at least a minimal amount of information, namely bar 816, which provides an indication of a relative audience size and/or composition. Any suitable method for displaying an indicator that a cell is part of or not part of the media plan may be used. For example, each of the plurality of cells in grid arrangement 802 may all show representations of audiences in the same way, but may contain an additional flag within each cell that indicates whether or not the associated advertising slot is part of the media plan, such as a border around the cell, a checkmark within the cell, a particular shading of the cell, or any suitable combination thereof.

In some embodiments, the user may manually select a particular cell to add or remove its associated advertising slot to the media plan. For example, processing circuitry 206 may receive a user selection of cell 814 from display 800, which causes processing circuitry 206 to generate for display a suitable indicator that cell 814 is selected. The user may then select an "add" function, which adds the advertising slot associated with cell 814 to the media plan. In response, cell 814 may then take on a similar appearance to cell 806, and display a background indicator and an index indicator. Once the advertising slot associated with cell 814 is added to the media plan, processing circuitry may generate a message to be communicated to audience management module 328 that the advertising slot is to be added to the plan. In some embodiments, the manual addition of an advertising slot may override a recommended media plan generated by audience management module 328.

If processing circuitry 206 receives a user selection of, for example, cell 806 from display 800, processing circuitry 206 may generate for display a suitable indicator that cell 806 is selected. Processing circuitry 206 may receive a user selection of a "remove" function, which removes the advertising slot associated with cell 814 to the media plan. In response, cell 806 may then take on a similar appearance to cell 814, in which information is removed from the cell to indicate that it is no longer part of the media plan. Once the advertising slot associated with cell 806 is removed from the media plan, processing circuitry may generate a message to be communicated to audience management module 328 that the advertising slot is to be removed to the plan. In some embodiments, the manual removal of an advertising slot may override a recommended media plan generated by audience management module 328.

In some embodiments, the user may select multiple cells by manually selecting cells in succession. In some embodiments, processing circuitry 206 may receive a user selection of a content source or a time period, which in turn causes processing circuitry 206 to select each cell associated with the content source or time period. For example, a user selection of "Early Fringe" from time period axis 804 may cause processing circuitry 206 to select all cells in that column for that time period, including cells 806 and 814. Processing circuitry 206 may also generate for display a suitable indicator for each of the selected cells indicating that each cell is selected. Processing circuitry 206 may then receive a user selection of a particular function to perform on each of the selected cells. Processing circuitry 206 may execute a function on each of the selected cells, such as adding all cells to the media plan (unless they have been added already), removing all cells from the media plan (unless they have been removed already), displaying additional information for each cell in the form of pop-up overlay, updating a weight value related to an associated advertising slot of each of the selected cells, updating an audience representation for each of the plurality of cells (for example, but receiving more current audience information from audience management module 328), assigning a fixed price value, or any other suitable function in accordance with the embodiments described herein. It is to be understood that each of these functions may also be executed on single cell in response to a user selection of a single cell.

In some embodiments, the user may desire to perform a placement function on less than all available advertising slots. For example, processing circuitry 206 may receive a user selection of a group of cells using any of the method described herein, and indicate that a placement function should be performed on the group of cells. The placement function is performed by audience management module 328, and will be described in greater detail with respect to FIGS. 13 and 14. Performing the placement function on the group of cells may result in audience management module 328 selecting a subset of cells from the group that are optimal for helping the advertiser to achieve the desired campaign goals. For example, each cell of the group may be ranked based on audience-related information of the associated advertising slot of the cell, such as audience size, projected impressions, audience composition, user-designated weights, total cost, or any other suitable parameter described herein.

In some embodiments, only the highest ranked advertising slots will be added to the media plan. Prior to performing the placement function, the user may specify a weight value or budget limit such that cells are added to the subset in a way that avoid exceeding the weight value or budget limit. For example, audience management module 328 may automatically, without user input, add advertising slots to the subset in order of highest rank, until the budget limit is exceeded by any further additions. Each advertising slot may have an associated cost (e.g. CPM), which is used to determine a total budget for all associated cells added to the subset. Processing circuitry 206 may then indicate to the user, using any suitable indicator, which cells have been automatically selected by the placement function. The user may then confirm the selection of these cells for adding to the media plan, and processing circuitry 206 may then transmit this information back to audience management module 328.

The media plan interface provides the user with additional viewing options to see information that is not shown in the default view.

Figure 9:
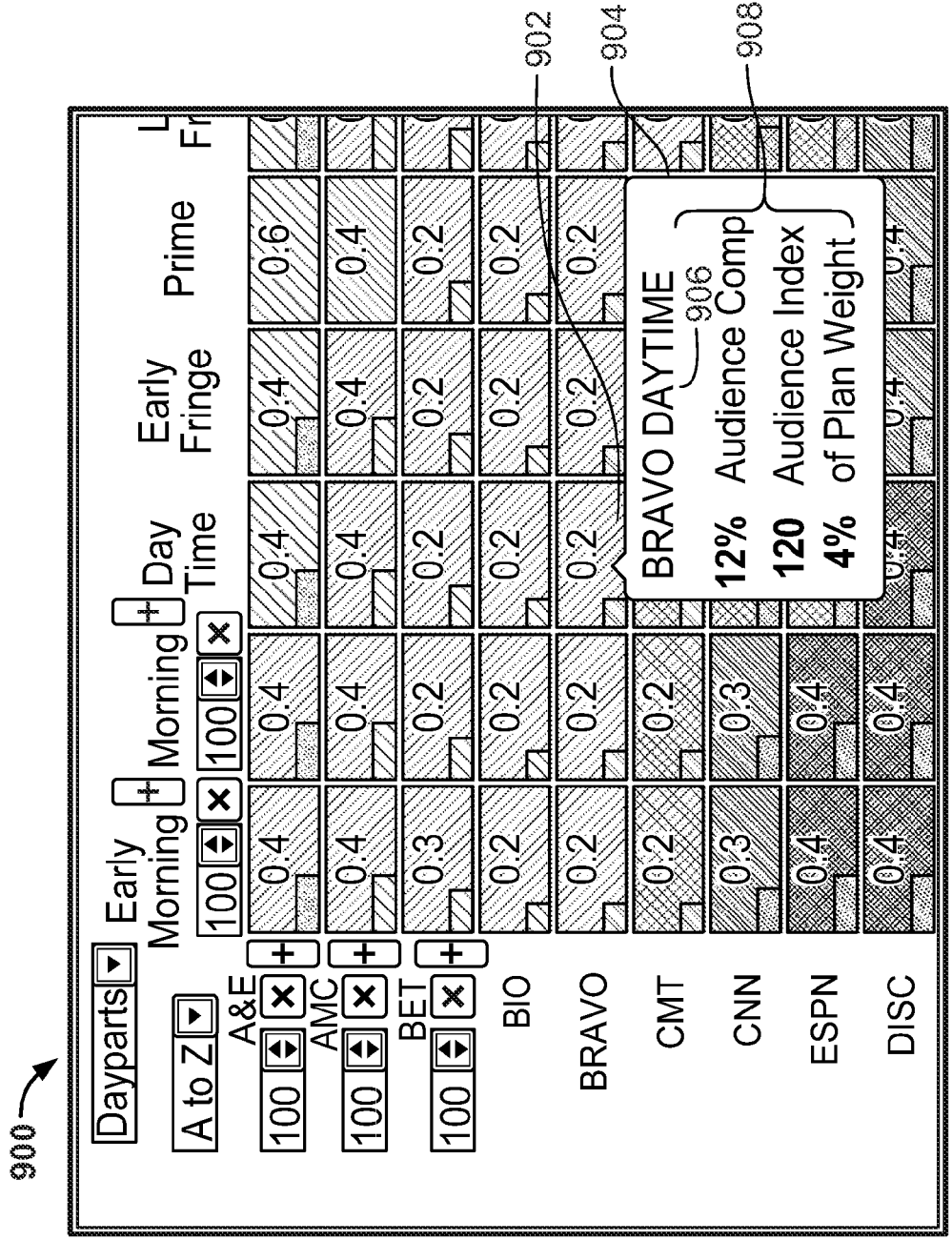
FIG. 9 shows an illustrative media plan interface with a detailed information display in accordance with some embodiments of the disclosure.

FIG. 9 shows an illustrative media plan interface with a detailed information display in accordance with some embodiments of the disclosure. Display 900 shows a plurality of cells that have been added to a media plan. Cell 902 corresponds to an available advertising slot for the content source "BRAVO" in the "Daytime" time period. Processing circuitry 206 may receive a user selection of cell 902 using any suitable method described herein. In some embodiments, the user may hover a cursor over cell 902, which in turn may cause processing circuitry 206 to generate for display additional information related to cell 902. In some embodiments, additional information for the cell may be in the form of a video clip (e.g. a preview clip) of media content available through a corresponding content source at a particular time period (e.g. what is airing on the BRAVO channel during the daytime).

Display 900 shows additional information related to cell 902 displayed in the form of pop-up overlay 904. Pop-up overlay 904 contains source/time indicator 906, which indicates to the user the content source and time period to which cell 902 corresponds. Pop-up overlay 904 contains information indicators 908, which may provide information relating to the media plan and audience-related parameters pertaining the advertising slot associated with cell 902, the corresponding source, the corresponding time period, or any suitable combination thereof. Pop-up overlay 904 displays an indication of the audience composition for the associated advertising slot, an audience index related to a relative audience size, and a plan weight percentage for the content source "BRAVO" (indicating a total a relative amount of plan weight or budget allocated to advertising slots in of that content source). In general, pop-up overlay 904 provides the user with information about the advertising slot that is otherwise not shown in cell 902.

The media plan interface may provide additional options for adjusting parameters and viewing detailed information related to a media plan.

Figure 10:
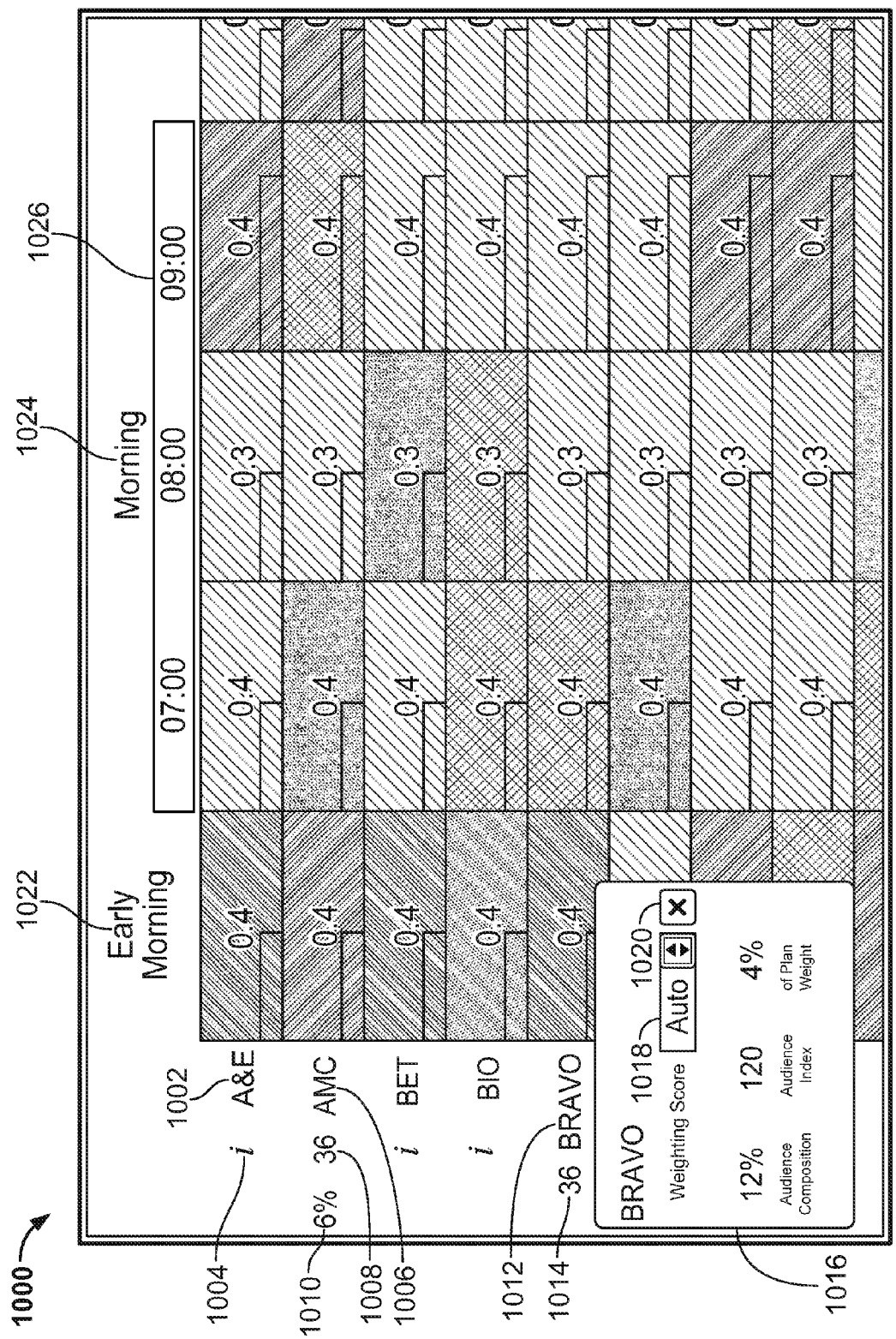
FIG. 10 shows weighting options for content sources and time periods for an illustrative media plan interface in accordance with some embodiments of the disclosure.

FIG. 10 shows weighting options for content sources and time periods for an illustrative media plan interface in accordance with some embodiments of the disclosure. Display 1000 shows cells arranged according to content source axis 1002 and time period axis 1022. Display 1000 is an alternative layout to display 700. For example, element 1004 is a representative element that appears next to each content source by default. In response to a user selection of element 1004, processing circuitry 206 may generate for display additional information relating to the content source corresponding to element 1004 (i.e. the "A&E" channel). In some embodiments, the additional information may be in the form of a pop-up overlay generated for display by control circuitry 206, such as pop-up overlay 1016. Pop-up overlay 1016 displays additional information about the "BRAVO" channel, such as audience composition (which is an average audience composition of each cell/advertising slot for that content source), average audience index (which is a weighted average of all audience indices for that content source), and percent of plan weight (which relates to the percentage of impressions to be delivered during the advertising campaign for this content source out of the total impressions to be delivered). The user may select weighting option 1018 to adjust a relative weight of the selected content source, as described previously with respect to FIG. 7. A user selection of option 1020 will close pop-up overlay 1016.

If processing circuitry 206 receives a user selection of a weight value for a content source other than the default value, element 1004 may be replaced with a value reflecting the weight value. For example, weight values 1008 and 1014 appear instead of the default element. In some embodiments, display 1000 may also display an in-plan weight for a particular content source, such as indicator 1010. For example, indicator 1010 may represent the recommended plan weight for channel 1006, as determined by audience management module 328, and may be displayed in response to a user adding or removing advertising manually.

In some embodiments, a combination of different time periods may be used. For example, daypart indicator 1022 shows cells/advertising slots for "Early Morning". Hour indicator 1026 shows an hourly breakdown for daypart indicator 1024. For example, in response to a user selection of daypart indicator 1024, processing circuitry 206 may generate for display columns corresponding to hours during "Morning" as an alternative to selecting all cells for that time period. In some embodiments, the user may select advertising slots for individual hours to add to or remove from the plan. Depending on the granularity of the display, a user selection may add all or remove all advertising slots. In other words, a selection of a daypart indicator or a cell corresponding to a daypart/content source combination may be treated as a selection of all time periods within the daypart. Any function executed with respect to the time period (daypart) will affect all shorter time periods (hours) within. In some embodiments, the user may lock a particular advertising slot to prevent a group function from affecting the status of the advertising slot.

The media plan interface may also allow a user view pricing information with respect to available inventory for a media plan.

Figure 11:
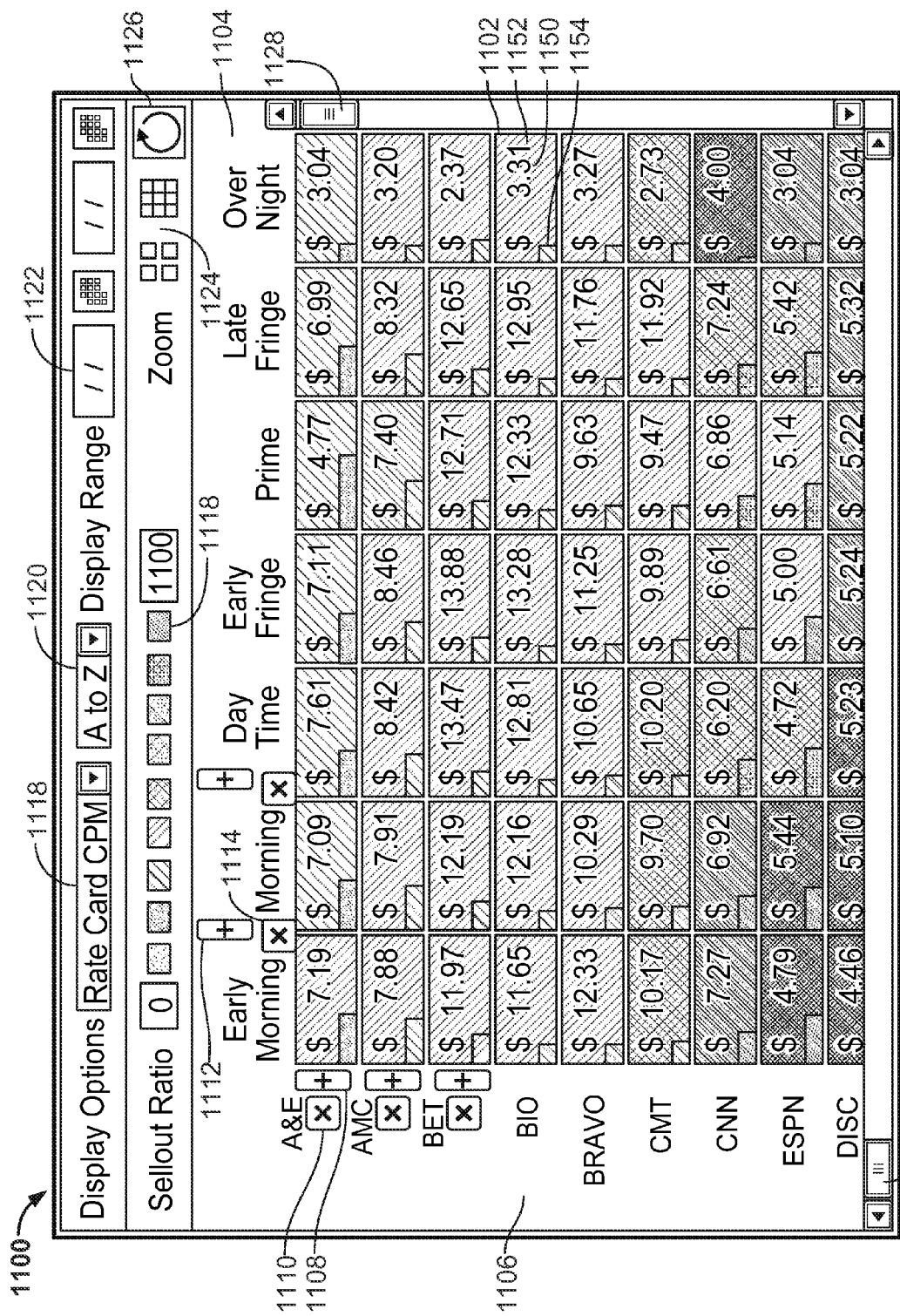
FIG. 11 shows a pricing display for an illustrative media plan interface in accordance with some embodiments of the disclosure.

FIG. 11 shows a pricing display for an illustrative media plan interface in accordance with some embodiments of the disclosure. As an alternative view to display 700, the media plan interface may be presented to a user in the form of display 1100, in accordance with the embodiments described herein. Display 1110 represents a media plan interface that allows the user to view pricing information for various advertising slots. For example, cell 1102 includes cost indicator 1152 (cost in CPM), background indicator (related to sellout ratio), and bar 1154 (relative audience size indicator). Density indicator 1110 may provide a visual representation of the magnitude of sellout ratios for each of the plurality of cells, as depicted by their respective background indicators.

In some embodiments, the user may select options 1108 and 1112, which provide increased granularity for the content source or time period that each represents. In some embodiments, options 1108 and 1112 may appear in response to a user selection on a content source of content source axis 1106 and a time period of time period axis 1104, respectively. For example, a selection of option 1112 may cause processing circuitry 206 to generate for display an hour view corresponding to "Early Morning", as described above with respect to FIG. 10. The hourly view may display prices for each displayed hour. A user selection of options 1110 and 1114 may cause options 1108 and 1112, respectively, to disappear from display 110, and may result in the corresponding row or column to revert back to a default view.

In some embodiments, the user may select display option 1118 to display a particular type of price (e.g. premium rate card, based on standard rates for underlying units in a particular pricing tier, clearance CPM, based on a rate required to clear remaining units to be cleared by a publisher, and fixed CPM, based on a fixed CPM for all impressions in the tier).

A user selection of zoom option 1124 may result in a relative increase or decrease in size of elements appearing in display 1100, or a relative increase or decrease in granularity of the information appearing in display 1100. Zoom option 1124 may be implemented in any suitable fashion, such as a slider, buttons of various sizes, a percentage indicator, or any suitable combination thereof. In some embodiments, if the user selects a "zoom-in" option, this may cause processing circuitry 206 to increase the granularity of the information displayed by, for example, replacing existing time period columns with time period columns corresponding to shorter time periods, as discussed with respect to FIG. 7. Display 1100 may then also display information associated with these shorter time periods, such as available advertising slots in those time periods and relevant audience-related parameters. A user selection of sort option 1120 may result in the plurality of cells being sorted by content source in a similar fashion as described in relation to FIG. 7.

To navigate to information that is not currently visible, the user may select scroll options 1128 and 1130 to scroll the display along content source axis 1106 and time period axis 1104, respectively. If the user selects refresh option 1126, processing circuitry may retrieve updated information from audience management module 328, and update the display 1100 with this information as necessary. In some embodiments, the user may select display range option 1122 to show time periods within a particular time range. This may have a similar effect to selecting zoom option 1124 by adjusting the granularity of the plurality of cells in display 1100.

In some embodiments, the user may directly select a cell of the plurality of cells in display 1100. Once the cell is selected, the user may take an action suggestive of a particular function to execute with the respective cell, as discussed above with respect to FIG. 7. Functions may be performed locally on user equipment device 300. For example, a user may select an option to set a fixed price for one of the plurality of cells. The fixed price may be a current price that the user wishes to hold constant, or may be changed to a user-designated price. Audience management module 328 may generate updated pricing for each advertising slot associated with the plurality of cells in response to the user setting a fixed price. For example, audience management module 328 may determine a projected demand for each of the plurality of cells using any suitable method described herein, and update the cells accordingly, but without affecting any cells that have fixed prices. In some embodiments, the fixed price may be utilized as a model parameter to determine its effect on other advertising slots based on a predicted demand for that slot or neighboring slots by competing advertisers.

Figure 12:
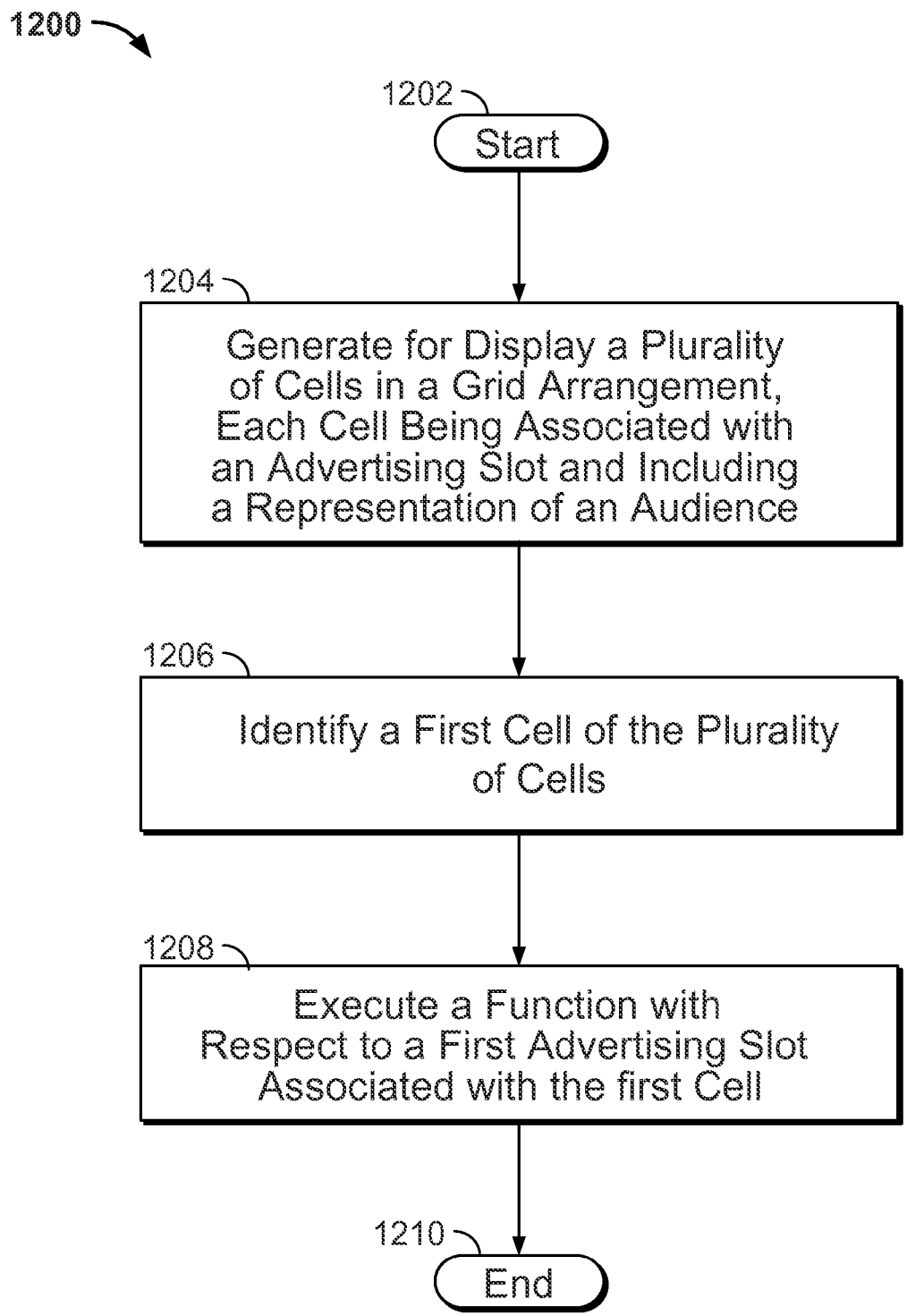
FIG. 12 is a flowchart of the illustrative steps involved in generating for display a media plan interface in accordance with some embodiments of the disclosure.

FIG. 12 is a flowchart of the illustrative steps involved in generating for display a media plan interface. It should be noted that process 1200 or any step thereof could be performed on, or provided by, any of the devices shown in FIGS. 2 and 3. For example, process 1200 may be executed by control circuitry 204 (FIG. 2) as instructed by an audience management system, or a module thereof (e.g., implemented on audience management module 328 (FIG. 3)) in order to generate for display a media plan interface. In addition, one or more steps of process 1200 may be incorporated into or combined with one or more steps of any other process or embodiment (e.g., as described in relation to FIGS. 13-16).

At step 1202, the audience management system initiates process 1200. For example, in some embodiments, the audience management system may initiate process 1200 in response to a user request (e.g., received via user input interface 210 (FIG. 2)) requesting a generation of a display of a media plan interface. At step 1204, the audience management system generates for display a plurality of cells in a grid arrangement each cell being associated with an advertising slot and including a representation of an audience. For example, the audience management system may generate (e.g., via control circuitry 204 (FIG. 2)) for display (e.g., on display 212 (FIG. 2)) a media plan interface (e.g., media plan interface 700 (FIG. 7)). As discussed in relation to FIG. 7, the media plan interface may present numerous types of data. For example, the media plan interface may present data relating to content sources, time periods, inventory, projected inventory, pricing, historical viewership data, audience metrics and analytics.

In some embodiments, the audience management system may be located remotely from a user equipment device (e.g., user equipment devices 302, 304, and/or 306 (FIG. 3)) that is presenting the media plan interface (e.g., media plan interface 200 (FIG. 2)). For example, the audience management system (e.g., implemented on audience management module 328 (FIG. 3)) may receive user input parameters (e.g., selecting cells in order to execute a function associated with the respective cells) entered into a user input interface (e.g., user input interface 210 (FIG. 2)) on a local user equipment device (e.g., user equipment devices 302, 304, and/or 306 (FIG. 3)). The local user equipment device may then transmit (e.g., via communications network 314 (FIG. 3)) the received user input parameters for receipt by the audience management system (e.g., implemented on audience management module 328 (FIG. 3)).

In some embodiments, the audience management system may be located locally. For example, the audience management module may be implemented on a user equipment device (e.g., user equipment device 200 (FIG. 2)) that is presenting the media plan interface (e.g., media plan interface 200 (FIG. 2)). The audience management system (e.g., implemented on user equipment device 200 (FIG. 2)) may receive user input parameters (e.g., selecting cells in order to execute a function associated with the respective cell) entered into a user input interface (e.g., user input interface 210 (FIG. 2)). The local user equipment device may then process the user input parameters (e.g., via processing circuitry 206 (FIG. 2)) and generate for display the result of the executed function on a display (e.g., display 212 (FIG. 2)).

In some embodiments, the local audience management system may receive (e.g., via communications network 314) data (e.g., values associated with one or more cells featured in the media plan interface, graphical elements for visual indicators of an audience-related parameter, and/or any other data necessary for generating/performing the embodiments described herein) from one or more remote sources (e.g., media content source 316, media guidance data source 318, user profile server 324, audience management module 328, and/or any location accessible via communications network 314 (FIG. 3)). In such cases, the audience management system may store (even temporarily) received data in local memory (e.g., storage 208 (FIG. 2)) until retrieval (e.g., by control circuitry 204 (FIG. 2)) by the audience management system.

At step 1206, the audience management system identifies a first cell of the plurality of cells. In some embodiments, identifying a first cell may include receiving a user selection of a first cell. For example, the audience management system may detect that a user (e.g., via user input interface 210 (FIG. 2)) has entered a user input parameter associated with a cell (e.g., cell 814 (FIG. 8)) of the plurality of cells (e.g., the plurality of cells in grid arrangement 802 (FIG. 8)). Alternatively, the audience management system may automatically select a first cell. For example, the audience management system may select (e.g., via processing circuitry 206 (FIG. 2)) a first cell (e.g., cell 814 (FIG. 8)) of the plurality of cells (e.g., the plurality of cells in grid arrangement 802 (FIG. 8)) based on a predefined order (e.g., the first cell is the next cell in a sequence of cells for which a function is executed), a characteristic of the first cell (e.g., the first cell has not yet been subject to the execution of a function), etc.

In some embodiments, as discussed above, the audience management system may be located locally. In such cases, the user input parameter received (e.g., via user input interface 210 (FIG. 2)) may be processed locally (e.g., at processing circuitry 206 (FIG. 2)) by comparing the received user input parameter to data and/or instructions located at the user equipment device (e.g., user equipment device 200 (FIG. 2)). In some embodiments, as discussed above, the audience management system may be located remotely. In such cases, the user input parameter received (e.g., via user input interface 210 (FIG. 2)) may be processed remotely (e.g., at audience management module 328 (FIG. 3)), after the received user input parameter is transferred (e.g., via communications network 314 (FIG. 3)) to a location (e.g., audience management module 328 (FIG. 3)) at which the audience management system is implemented.

At step 1208, the audience management system executes a function with respect to a first advertising slot associated with the cell. For example, in response to receiving a user selection (e.g., via user input interface 210 (FIG. 2)) of a first cell (e.g., cell 814 (FIG. 8)) of the plurality of cells (e.g., the plurality of cells in grid arrangement 802 (FIG. 8)), the audience management system may execute (e.g., via control circuitry 204 (FIG. 2)) a function associated with the advertising slot corresponding to the selected cell.

For example, in some embodiments, the function may add or remove an advertising slot from an advertiser's media plan and/or otherwise modify a characteristic of the advertising slot associated with the selected cell. As discussed above, in some embodiments, a user may manually select (e.g., via user input interface 210 (FIG. 2)) a particular cell to add or remove its associated advertising slot to a media plan (e.g., as displayed in a media plan interface). For example, in response to the user selection, the media plan interface (e.g., displayed by control circuitry 204 (FIG. 2)) may present (e.g., on display 212 (FIG. 2)) an "add" function, which adds the advertising slot associated with the selected cell (e.g., cell 814 (FIG. 4)) to the media plan. In another example, the media plan interface may present a "remove" function, which removes the advertising slot associated with the selected cell.

In some embodiments, based on the function executed with respect to the select cell, the audience management system may modify the visual or graphical properties, such as the background indicator and/or index indicator discussed in relation to FIG. 8. Additionally or alternatively, if an advertising slot associated with a selected cell (e.g., cell 814 (FIG. 8)) is added to the media plan (e.g., displayed on display 212 (FIG. 2)), the audience management system (e.g., via processing circuitry 206 (FIG. 2)) may add to the advertising slot to the media plan (e.g., via communicating the addition to audience management module 328).

In some embodiments, the function may be executed locally (e.g., at user equipment devices 302, 304, and/or 306 (FIG. 4)) or remotely (e.g., at audience management module 328 and/or any location accessible via communications network 314 (FIG. 3)). For example, if a user equipment device (e.g., user equipment device 200 (FIG. 2)) with which a user is interacting with is located remotely from a device upon which the audience management system is implemented (e.g., audience management module 328 FIG. 3)) and the function requires one or more processes to be performed remotely (e.g., at audience management module 328), the local device (e.g., user equipment device 200 (FIG. 2)) may transmit a request to perform the function, along with any additional data, from the local device to the remote location. After executing the function (e.g., via processing circuitry located at the remote location), the audience management system may transmit (e.g., via communications network 314 (FIG. 3)) updated information to the local device for display (e.g., on display 212 (FIG. 2)).

At step 1210, the audience management system ends process 1200. In some embodiments, the audience management system may return to step 1204 and generate for display a plurality of cells in a grid arrangement in which each cell is associated with an advertising slot as updated by the executed function in step 1208.

In some embodiments, the audience management system may update an audience representation for each of the plurality of cells based on selections associated with different advertising campaigns. Multiple media plans/advertising campaigns may created by the user or generated by the audience management system and stored (e.g., at audience management module 328 (FIG. 3)). Based on information in each of the stored media plans/advertising campaigns, the representation of audience information may be updated accordingly (e.g., via processing circuitry 204 (FIG. 2)) in response to receiving a user selection of a particular function. For example, the plurality of cells may be updated (e.g., via processing circuitry 204 (FIG. 2)) to show whether associated advertising slots have been allocated to another media plan, an indicator of high demand for the associated advertising slots, whether the target audience is similar to a target audience of a different advertiser, a number of advertisers that have (or intend to) purchase the advertising slot, or any suitable combination thereof. In some embodiments, the audience representation may be updated by removing audience representation information to indicate that the cell/advertising slot was already selected for another advertising campaign.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-3 could be used to perform one of more of the steps in FIG. 12.

Figure 13:
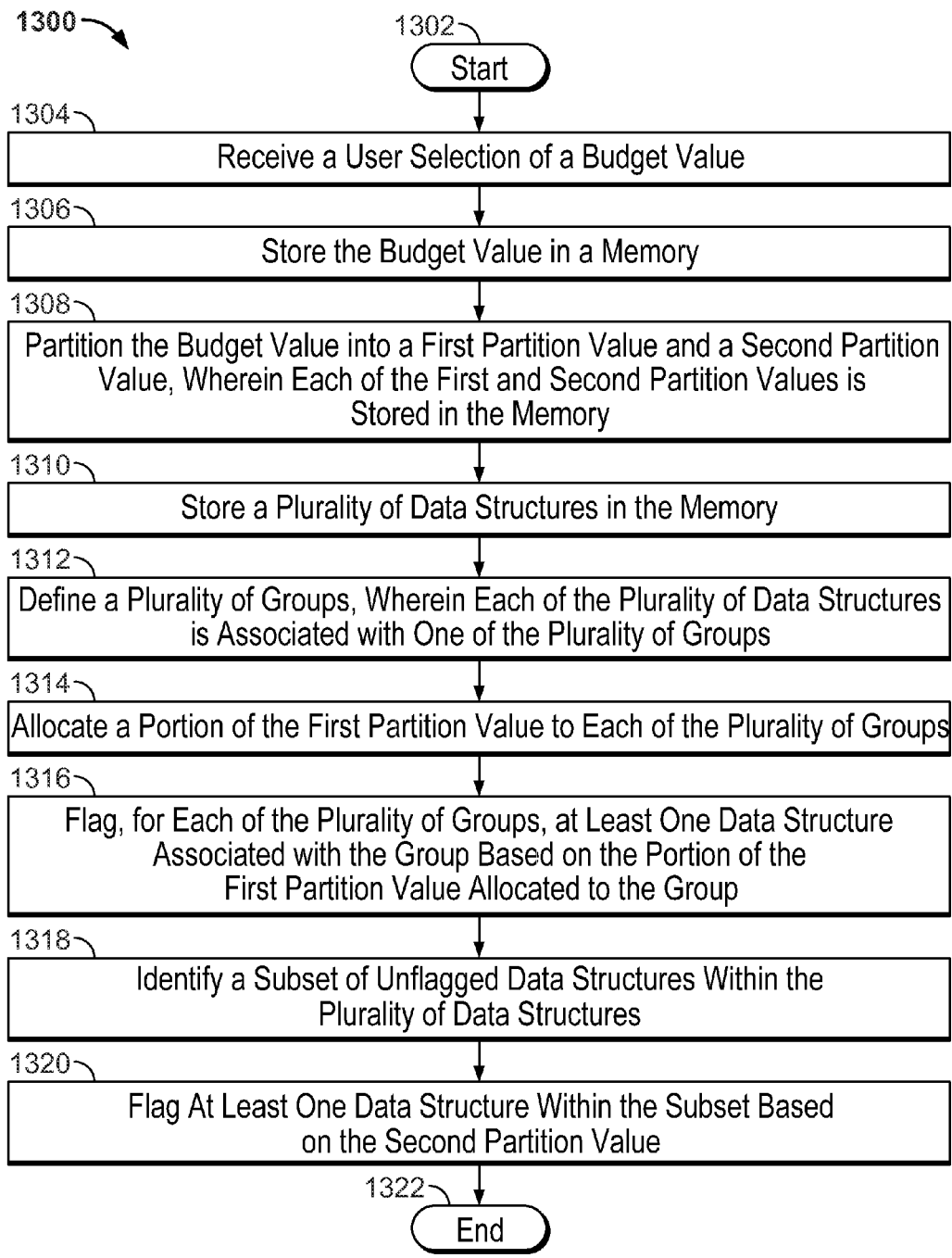
FIG. 13 is a flowchart of the illustrative steps involved in media plan allocation from a systems perspective in accordance with some embodiments of the disclosure.

FIG. 13 is a flowchart of the illustrative steps involved in media plan allocation from a systems perspective. It should be noted that process 1300 or any step thereof could be performed on, or provided by, any of the devices shown in FIGS. 2-3. For example, process 1300 may be executed by control circuitry 204 (FIG. 2) as instructed by an audience management system, or a module thereof (e.g., implemented on audience management module 328 (FIG. 3)) in order to allocate data structures in a media plan. In addition, one or more steps of process 1300 may be incorporated into or combined with one or more steps of any other process or embodiment (e.g., as described in relation to FIGS. 12 and 14-16).

It should also be noted that process 1300 may also be adapted to allocate budget values in numerous ways. For example, in some embodiments, the audience management system may allocate the budget value to various groups such as time periods, content providers, programming types, and/or selected advertising universes. Moreover, in some embodiments, groups may be defined using Boolean expressions (e.g., allocating a portion of a budget value to only a particular time period and a particular content provider).

At step 1302, the audience management system initiates process 1300. For example, in some embodiments, audience management system may initiate process 1300 in response to a user request (e.g., received via user input interface 210 (FIG. 2)) requesting a budget limit associated with the advertising slots in a media plan interface.

At step 1304, the audience management system receives a user selection of a budget value. For example, the user selection may indicate a numerical value (e.g., in monetary units and/or any other suitable measurement standard) that indicate a maximum value for which advertising slots in a media plan must correspond. In some embodiments, the value may be manually entered by a user (e.g., via user input interface 210 (FIG. 2)). For example, a user (e.g., via user input parameters) may specify the maximum value that the user may allocate to advertising slots over a given period of time (e.g., one calendar month).

In some embodiments, the user selection may be received automatically. For example, the advertisement management system may retrieve (e.g., from user profile server 324 (FIG. 3)) a value allocated by the user for advertisement slots a predetermined time, for example, corresponding to cycles at which advertising slots are typically filled (e.g., the first of each month).

At step 1306, the media guidance application stores the budget value in memory. For example, the advertisement management system may store the budget value in memory (e.g., located locally at storage 208 (FIG. 2)) or located remotely at audience management module 328 and/or any database accessible via communications network 314 (FIG. 3)). In some embodiments, the budget value may be entering into a data structure associated with one or more users. For example, the database may include a plurality of records each associated with a user. In response for the stored budget value, the advertisement management module may then input an identifier (e.g., a serial number corresponding to a particular user), and the database may output a record indicating the budget value associated with the particular advertiser (or user, if the user is the advertiser).

At step 1308, the media guidance application partitions the budget value into a first partition value and a second partition value, in which each of the first and second partition values is stored in the memory. For example, the audience management system may receive (e.g., via user input interface 210 (FIG. 2)) a user selection of a budget value that corresponds to a fixed budget for an advertising campaign. The audience management system may then (e.g., via processing circuitry 206 (FIG. 2)) partition the budget value into a first partition value and a second partition.

The ratio, percentage, and/or other numerical relationship between the partitions may be based on numerous criteria. For example, the audience management system may receive (e.g., via user input interface 210 (FIG. 2)) user selection identifying a numerical relationship between the partitions. For example, a user selection may indicate that the first partition value should correspond to 70% of the total budget, and the second partition value should correspond to 30% of the total budget. It should also be noted that in some embodiments, a total budget may be allocated to any number of partitions. For example, a user selection may indicate that the first partition value should correspond to 50% of the total budget, the second partition value should correspond to 25% of the total budget, and the third partition value should correspond to 25% of the total budget. In another example, a user selection may indicate that the first partition value should correspond to 60% of the total budget, and the remaining partition values should split the remaining 40% of the total budget according to another partitioning system, allocation algorithm, and/or any other suitable technique for dividing the remaining 40% of the total budget.

In some embodiments, the audience management module may retrieve (e.g., via control circuitry 204 (FIG. 2)) a numerical relationship. For example, in response to receiving a budget value for a user, the audience management module may cross-reference a database (e.g., located at storage 208 (FIG. 2), user profile server 324 (FIG. 3), and/or any location accessible via communications network 314 (FIG. 3)) associated with numerical relationship for budget values corresponding to user. The audience management module may input the particular user into the database and receive an output of a numerical relationship used for partitioning the budget value. In some embodiments, the output may also indicate the number of partitions (e.g., zero, one, etc.) that should be applied to the budget value as well as any other criteria (e.g., particular audiences that should be targeted for a particular partition) associated with each partition.

At step 1310, the audience management system stores a plurality of data structures in the memory. In some embodiments, the audience management system may store (e.g., in storage 204 (FIG. 2) and/or any database accessible via communications network 314 (FIG. 3)) (e.g., via processing circuitry 204 (FIG. 2)) a plurality of data structures, in which each data structure may correspond to a particular advertising slot. For example, as discussed in relation to FIGS. 7 and 8, the audience management system may manage advertisement slots associated with cells (e.g., cell 814 (FIG. 8)) in a grid arrangement (e.g., grid arrangement 802 (FIG. 8)). Each cell may be associated with a data structure that includes data relating to its respective content sources, time periods, inventory, projected inventory, pricing, historical viewership data, audience metrics and analytics, or any other suitable information described herein.

At step 1312, the audience management module defines a plurality of groups, in which each of the plurality of data structures is associated with one or the plurality of groups. For example, the audience management system defines (e.g., via processing circuitry 306 (FIG. 3)) a plurality of groups, and associates each of the plurality of data structures with one of the plurality of groups. For example, the groups may correspond to days in an advertising campaign, and each of the plurality of data structures may represent an advertising slot for a particular day. In some embodiments, each advertising slot may have an associated budget weight (e.g. a price). The system may determine that the advertising slots to be added do not exceed the allocated budget for the day by, for example, summing the budget weights and comparing the sum to the allocated budget (e.g., via processing circuitry 204 (FIG. 2)).

At step 1314, the audience management system allocates a portion of the first portion value to each of the plurality of groups. The audience management system allocates (e.g., via processing circuitry 304 (FIG. 3)) a portion (e.g., 10% of the total partition) of the first partition value to each of the plurality of groups. In some embodiments, a group may include one or more criteria of organizing various data structures. For example, a group may correspond to a particular day of the week. For example, if the first partition value corresponds to 50% of the total budget, each day (e.g., in a five day campaign) may receive a portion of the first partition value (e.g., 20% of the partition value). In some embodiments, each day may receive an equal allocation of the 70% (e.g. for a seven-day advertising plan, each day receives 10% of the total budget).

At step 1316, the audience management system flags, for each of the plurality of groups, at least one data structure associated with the group based on the portion of the first partition value allocated to the group. Flagging may be achieved by storing a particular value in the data structure that indicates to processing circuitry 204 that the data structure is flagged. For example, the audience management system may determine (e.g., via processing circuitry 204 (FIG. 2)) to flag one or data structures (e.g., corresponding to advertising slots) for each day of a campaign based on the portion of the first partition value allocated to the group. For example, the audience management system may identify (e.g., via processing circuitry 204 (FIG. 2)) a list of advertising slots for a particular day of the week that should be added to the media plan, as long as the list of advertising slots does not exceed the allocated budget for that day.

In some embodiments, the audience management systems ranks each data structure associated with a particular group based on audience-related criteria, including audience composition, audience size, audience index, impressions, user-specified weight, or any suitable combination thereof. In some embodiments, the audience-related criteria may be included in the data structure associated with each advertising slot. For example, the audience management system may (e.g., via processing circuitry 204 (FIG. 2)) cross-reference one or more databases (e.g., stored locally at storage 208 (FIG. 2) or remotely at user profile server 324, audience management module 328, and/or any other location accessible via communications network 314 (FIG. 3)) associated with audience-related criteria in order to rank each data structure as discussed in relation to FIG. 14. In some embodiments, the score may be assigned based on the equation SCORE=(Audience Index)*(Channel Weight)*(Daypart Weight). For example, Audience Index may be related to a projected audience size, and may be a function of audience size and audience composition. Channel Weight and Daypart Weight may be user-designated weight values assigned to a corresponding content source of the data structure (e.g., weight option 708 (FIG. 7)) and a corresponding time period (e.g., weight option 714 (FIG. 7)), respectively.

At step 1318, the audience management system identifies a subset of unflagged data structures within the plurality of data structures. In some embodiments, the audience management system (e.g., via processing circuitry 204 (FIG. 2)) identifies a remainder of data structures within the plurality of data structures that are unflagged regardless of the group that the data structures are associated with. For example, after allocating a portion of the first partition value to particular data structures, the audience management system may (e.g., via processing circuitry 204 (FIG. 2)) allocate a portion of the second partition value to other data structures. For example, the audience management system may search (e.g., via processing circuitry 204 (FIG. 2)) the data structures to identify data structures that were not flagged (e.g., purchased by a user).

At step 1320, the audience management system flags at least on data structure within the subset based on the second partition value. For example, in some embodiments, the audience management system may search (e.g., via processing circuitry 204 (FIG. 2)) the data structures to identify data structures that were not flagged (e.g., purchased by a user). The audience management system may then rank (e.g., as discussed below in relation to FIG. 14) each data structure and select the highest ranked unflagged data structure. For example, the audience management system may rank each data structure based on audience-related criteria, including audience composition, audience size, audience index, impressions, user-specified weight, campaign goals and parameters, such as total impressions, budget constraints, inventory restrictions, reach, frequency, or any suitable combination thereof. In some embodiments, the audience management system may select one or more audience-related criteria upon which to base the ranking. It should be noted that the ranking may be determine based on any suitable technique and/or mathematical process including, but not limited to, linear and non-linear approaches.

In some embodiments, the audience management system may perform (e.g., via processing circuitry 204 (FIG. 2)) one or more iteration of step 1318 until a particular portion of the second partition value is used. For example, the audience management system may perform iterations of step 1318 until the entirety of the second partition value is used. During each iteration, the audience management system may identify and compare (e.g., via processing circuitry 204 (FIG. 2)) the highest ranked data structure of the unflagged data structures to the remaining portion of the second partition value. If the audience management system determines (e.g., via processing circuitry 204 (FIG. 2)) that the identified highest ranked data structure of the remaining data structures of this iteration corresponds to (e.g., the amount of budget consumption associated with the identified data structure is equal to or is less than) the remaining portion of the second partition value, the audience management system flags the identified data structure. If not, the audience management system may select a different data structure as discussed below in relation to FIG. 14.

At step 1322, the audience management system ends process 1300. In some embodiments, the audience management system may return to step 1304 and receive a new budget value associated with a different advertiser (or user, if the advertiser is the user). For example, the audience management system may perform multiple iterations of process 1300 until each budget value for a plurality of advertisers is partitioned and allocated.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-3 could be used to perform one of more of the steps in FIG. 13.

Figure 14:
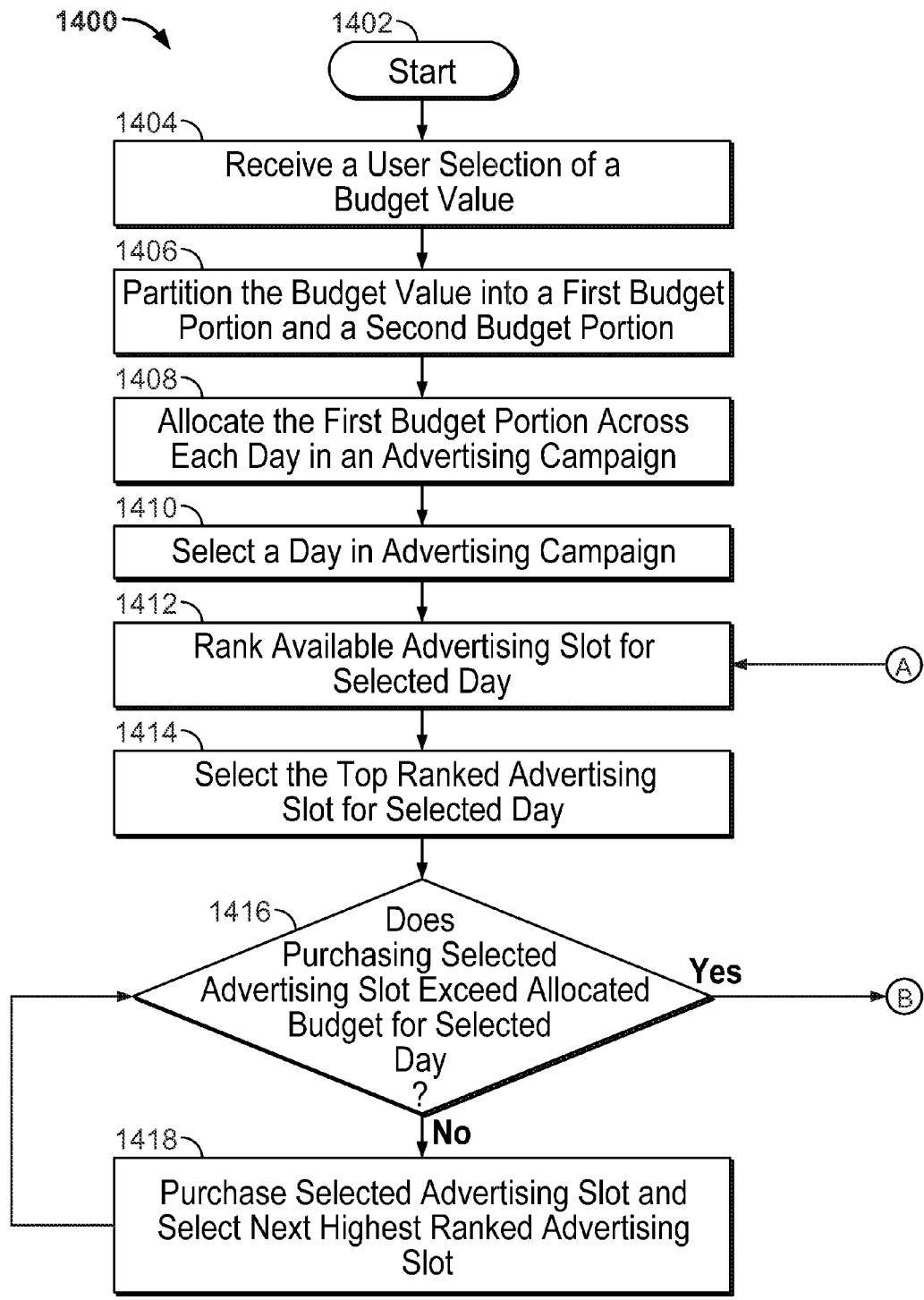
FIG. 14 is a flowchart of the illustrative steps involved in optimization and allocation of advertising slots for a media plan in accordance with some embodiments of the disclosure.
Figure 14:
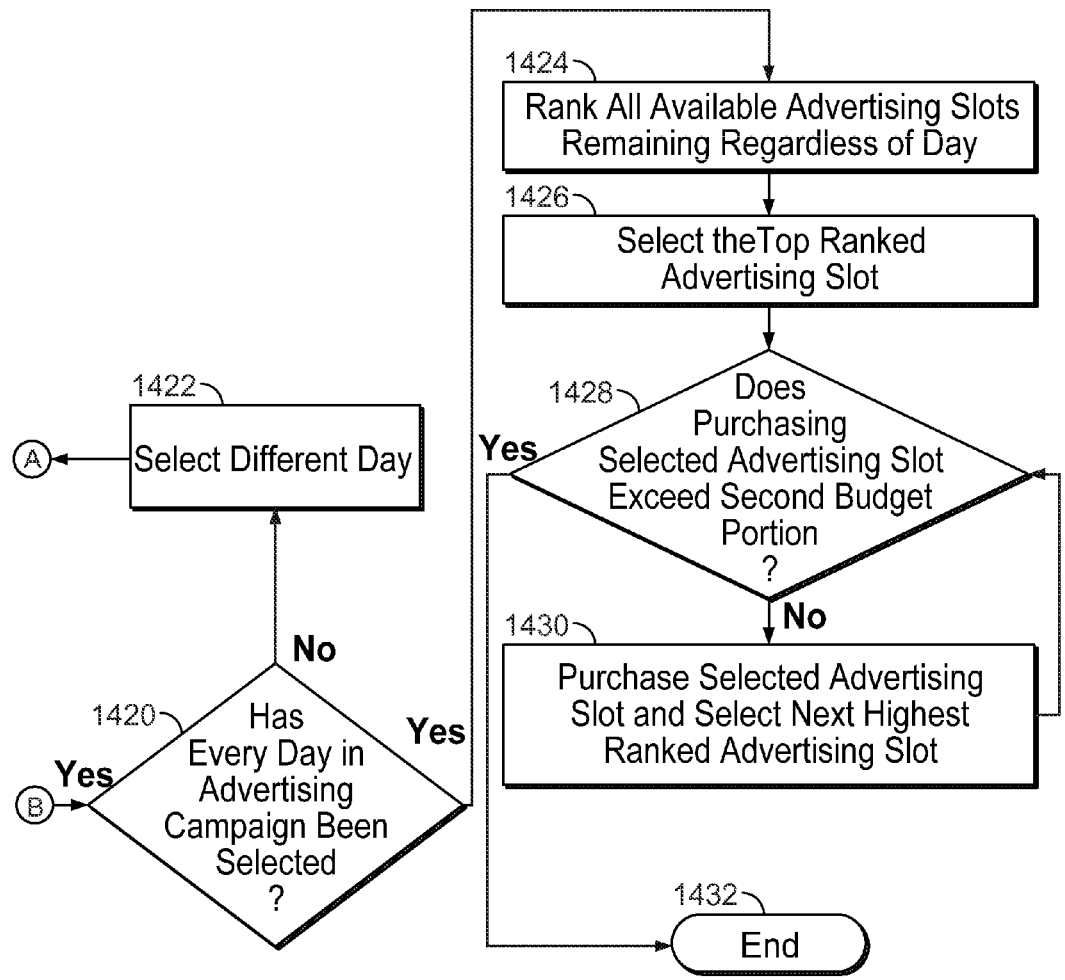

FIG. 14 is a flowchart of the illustrative steps involved in optimization and allocation of advertising slots for a media plan. It should be noted that process 1400 or any step thereof could be performed on, or provided by, any of the devices shown in FIGS. 2-3. For example, process 1400 may be executed by control circuitry 204 (FIG. 2) as instructed by an audience management system, or a module thereof (e.g., implemented on audience management module 328 (FIG. 3)) in order to allocate advertising slots for a media plan. In addition, one or more steps of process 1400 may be incorporated into or combined with one or more steps of any other process or embodiment (e.g., as described in relation to FIGS. 12-13 and 15-16).

At step 1402, the audience management system initiates process 1400. For example, in some embodiments, audience management system may initiate process 1400 in response to a user request (e.g., received via user input interface 210 (FIG. 2)) requesting to allocate a budget value of a user.

At step 1404, the audience management system receives a user selection of a budget value. For example, in some embodiments, step 1404 may correspond to step 1304 (FIG. 13). For example, the user selection may indicate a numerical value (e.g., in monetary units and/or any other suitable measurement standard) that indicate a maximum value for which advertising slots in a media plan must correspond. In some embodiments, the value may be manually entered by a user (e.g., via user input interface 210 (FIG. 2)). For example, a user (e.g., via user input parameters) may specify the maximum value that the user may allocate to advertising slots over a given period of time (e.g., one calendar month). Additionally or alternatively, the user selection may be received automatically. For example, the advertisement management system may retrieve (e.g., from user profile server 324 (FIG. 3)) a value allocated by the user for advertisement slots at a predetermined time, for example, corresponding to cycles at which advertising slot are typically filled (e.g., the first of each month).

At step 1406, the media guidance application partitions the budget value into a first budget portion and a second portion. For example, in some embodiments, step 1406 may correspond to step 1308 (FIG. 13) and the first budget portion and the second budget portion may correspond to the first partition value and the second partition value, respectively. For example, the audience management system may receive (e.g., via user input interface 210 (FIG. 2)) a user selection of a budget value that corresponds to a fixed budget for an advertising campaign. The audience management system may then (e.g., via processing circuitry 206 (FIG. 2)) partition the budget value into a first budget portion and a second budget portion. In some embodiments, the sum of the first budget portion and the second budget portion may correspond to the budget value (e.g., if entire the budget value is allocated into only two portions). Alternatively, the sum first budget portion and the second budget portion may not correspond to the budget value (e.g., if entire the budget value is not allocated and/or allocated into two or more portions).

At step 1408, the audience management system allocates the first budget portion across each day in an advertising campaign. In some embodiments, step 1408 may correspond to step 1314 (FIG. 13). For example, the audience management system may allocate (e.g., via processing circuitry 304 (FIG. 3)) an equal or unequal portion of the first budget portion across each day in an advertising campaign. For example, if an advertising campaign corresponds to five days, the audience management system may allocate each day a 20% share of the first budget portion. Alternatively, the audience management system may allocate unequal portions to different days of the advertising campaign. For example, the audience management system may allocate a higher portion to a weekend (e.g., when more viewers are consuming content) and allocate a lower portion to a weekday (e.g., when fewer viewers are consuming content).

At step 1410, the audience management system selects a day in the advertising campaign. For example, the number of days in the advertising campaign and an identification of the individual days in the advertising campaign may be retrieved from a profile associated with the user or with the advertising campaign. For example, the audience management system may cross-reference an identifier (e.g., a serial number, order number, etc.) associated with a user or an advertising campaign in a database (e.g., storage 208 (FIG. 2), user profile server 324 (FIG. 3), audience management module 328 (FIG. 3), or any other location accessible via communications network 314 (FIG. 3)) that lists the number of days in the advertising campaign and/or identifies the individual days in the advertising campaign.

The audience management system may input (e.g., via processing circuitry 206 (FIG. 2)) an identifier for the user and/or the advertising campaign. In response, the database may output a listing of the number of days in the advertising campaign and/or the individual days in the advertising campaign. The audience management system may then select one or more of the days. In some embodiments, the audience management system may perform one of more iterations of process 1400, in which each day of the advertising campaign is processed.

At step 1412, the audience management system ranks available advertising slots for the selected day. For example, the audience management system may retrieve (e.g., via processing circuitry 206 (FIG. 2)) data associated with available advertising slots that indicate the content sources, time periods, inventory, projected inventory, pricing, historical viewership data, audience metrics and analytics, or any suitable information described herein, associated with the advertising slot. Based on this data, the audience management system may determine that particular advertising slots that are associated with the selected day. After identifying the particular advertising slots available for the selected day based on data associated with the advertising slots, the audience management system proceeds to rank (e.g., via processing circuitry 204 (FIG. 2)) the identified advertising slots.

At step 1414, the audience management system selects the top ranked advertising slot for the selected day. For example, the audience management system may compare each advertising slot available on the selected day to each other to determine (e.g., via processing circuitry 204 (FIG. 2)) a rank of each advertising slot based on audience-related criteria, including audience composition, audience size, audience index, impressions, user-specified weight, campaign goals and parameters, such as total impressions, budget constraints, inventory restrictions, reach, frequency, or any suitable combination thereof. In some embodiments, the audience management system may select one or more audience-related criteria upon which to base the ranking. It should be noted that the ranking may be determine based on any suitable technique and/or mathematical process including, but not limited to, linear and non-linear approaches. In some embodiments, the ranking may performed in a fashion similar to that described in relation to FIG. 13.

In some embodiments, the system optimizes the use of inventory across all of the active media plans, enabling the system to optimize selections of advertising slots for multiple advertisers concurrently. In such cases in which a user is preparing media plans for more than one advertiser, the system may rank advertising slots for each media plan based on parameters associated with each media plan (e.g., via processing circuitry 204 (FIG. 2)). For example, the system may rank a particular advertising slot higher for one media plan, based on a weight value, an audience composition, or any other suitable parameter associated with that media plan (e.g. the advertiser has designated a target audience segment). The system may rank that same advertising slot for a different media plan. When determining to which the advertising slot should be allocated to a particular media plan, the system may select the advertising slot for the media plan corresponding to the higher rank. To prevent a particular advertiser from getting an unbalanced amount of inventory selections, the system may randomly select an advertising slot for a particular media plan when different media plan scores for the advertising slot fall within a particular range. In some embodiments, the selection may not be random, but instead may take into account the total number of selections made for different media plans to ensure an even allocation of high ranking inventory.

In some embodiments, the system may generate a single ranked list of advertising slots (e.g., via processing circuitry 204 (FIG. 2)), in which each advertising slot in the list is associated with a particular advertiser. The audience management system may proceed to add advertising slots to a respective media plan of the associated advertiser in order from highest ranking advertising slots to lowest ranking advertising slots.

At step 1416, the audience management system determines whether or not purchasing the selected advertising slot exceeds the allocated budget for the selected day. For example, the audience management system may determine (e.g., via processing circuitry 204 (FIG. 2)) whether or not the portion of the budget value allocated to the current day corresponds to (e.g., is equal to or less than), the cost to purchase the selected advertising slot based on a budget weight associated with the advertising slot. In some embodiments, the audience management system may receive the cost associated with advertising slots from a local (e.g. storage 208 (FIG. 2)) or remote (e.g., audience management module 328 (FIG. 3)) source.

In some embodiments, the costs associated with each advertising slot may be continuously monitored and updated. For example, the audience management system may receive a real-time feed indicating the current cost associated with each advertising slot. Additionally or alternatively, the audience management may have access to an algorithm that determines the current cost of the advertising slot based on one or more criteria. For example, an algorithm may indicate that as fewer advertising slots for a particular day remain, the cost to purchase an advertising slot on that day may increase. In such cases, the audience management system (e.g., via processing circuitry 204 (FIG. 2)) may continually determine prices for various advertising slots as necessary. Additionally or alternately, the audience management system may apply one or more step of process 1500 (FIG. 5) or process 1600 (FIG.16) to determine a cost of an advertising slot.

If the audience management system determines that the cost to purchase the selected advertising slot does not exceed the allocated budget for the selected day, the audience management system proceeds to step 1418. At step 1418, the audience management system purchases (or flags for potential purchasing, depending on user preferences) the selected advertising slot and selects the next highest ranking advertising slot (e.g., as determined in step 1412) before returning to step 1416. If the audience management system determines to that the cost to purchase the selected advertising slot exceeds the allocated budget for the selected day, the audience management system proceeds to step 1420.

At step 1420, the audience management system determines whether or not every day in the advertising campaign has been selected. If not, the audience management system proceeds to step 1422, selects a different day, and returns to step 1412. For example, the audience management system may ensure that the allocation of the first budget portion for each day is used. The audience management system may ensure this by performing multiple iterations of one or more steps of process 1400 (e.g., corresponding to each day of the advertising campaign). If the audience management system determines that every day in the advertising campaign has been selected, the audience management system proceeds to step 1424.

At step 1424, the audience management system ranks all available advertising slots remaining regardless of the day. For example, after the audience management system has allocated the first budget portion to each day, week, or user-specified period of the campaign (e.g., ensuring that at least one advertising slot has been purchased (or flagged for potential purchasing) for each day of the campaign). The audience management system ranks (e.g., via processing circuitry 204 (FIG. 2)) the remaining advertising slots to select additional advertising slots for purchasing (or flagging for potential purchasing).

At step 1426, the audience management system selects the top ranked advertising slot of any available advertising slot. For example, the audience management system may compare each advertising slot available to all other available advertising slots to determine (e.g., via processing circuitry 204 (FIG. 2)) a rank of each advertising slot based on audience-related criteria associated with a respective advertising slot (e.g., including, but not limited to, audience composition, audience size, audience index, impressions, user-specified weight, or any suitable combination thereof).

At step 1428, the audience management system determines whether or not purchasing the selected advertising slot exceeds the second budget portion. For example, the audience management system may determine (e.g., via processing circuitry 204 (FIG. 2)) whether or not the second budget portion value corresponds to (e.g., is equal to or less than), the cost to purchase the selected advertising slot. If the audience management system determines that the cost to purchase the selected advertising slot does not exceed the second budget portion, the audience management system proceeds to step 1430. At step 1430, the audience management system purchases (or flags for potential purchasing) the selected advertising slot and selects the next highest ranking advertising slot (e.g., as determined in step 1424) before returning to step 1428. If the audience management system determines to that the cost to purchase the selected advertising slot exceeds the second budget portion, the audience management system proceeds to step 1432.

At step 1432, the audience management system ends process 1400. In some embodiments, the audience management system may return to step 1404 and receive a new budget value associated with a different user. For example, the audience management system may perform multiple iterations of process 1400 until each budget value for a plurality of users is partitioned and allocated.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-3 could be used to perform one of more of the steps in FIG. 14.

Figure 15:
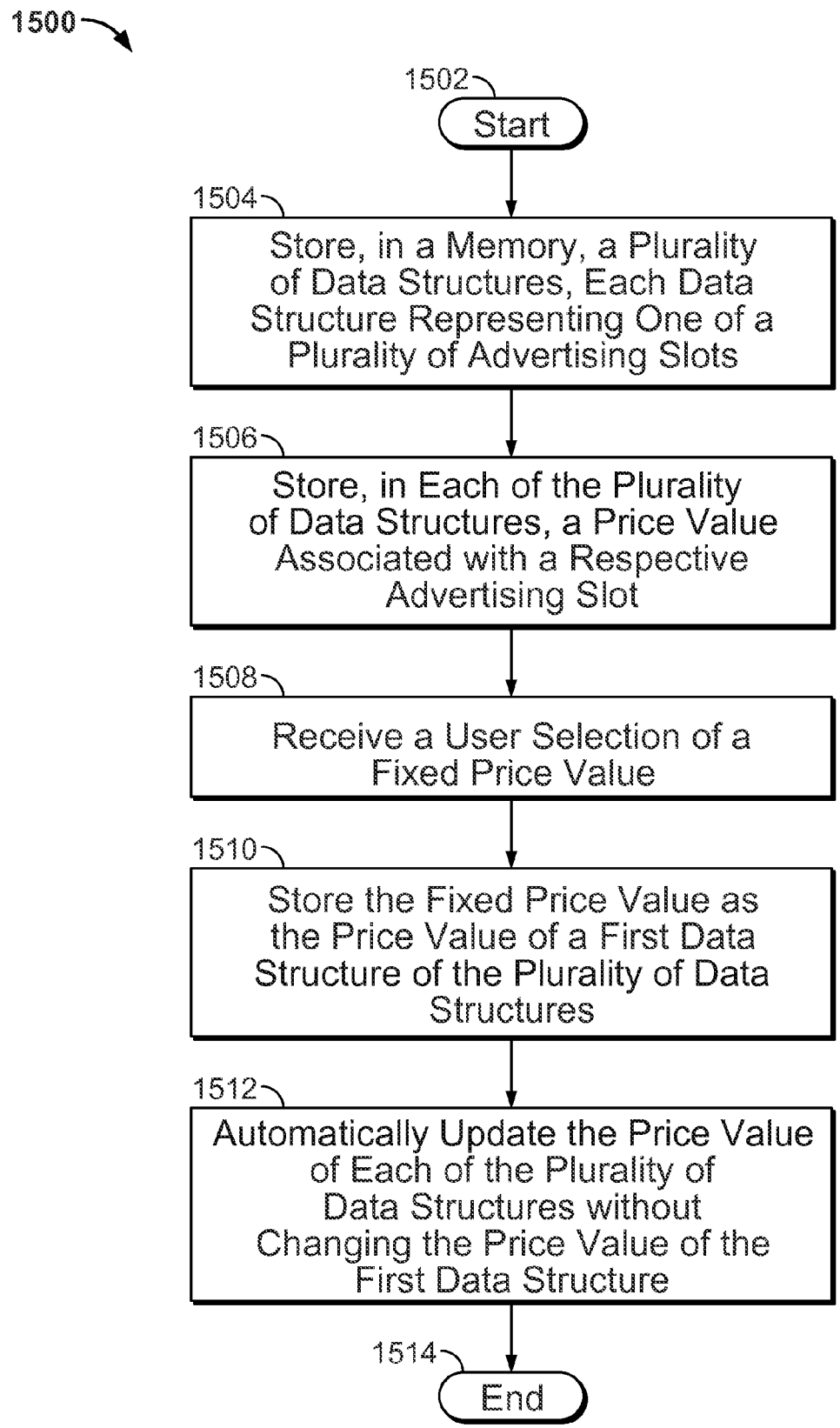
FIG. 15 is a flowchart of the illustrative steps involved in static and dynamic pricing of advertising slots for a media plan in accordance with some embodiments of the disclosure.

FIG. 15 is a flowchart of the illustrative steps involved in static and dynamic pricing of advertising slots for a media plan. It should be noted that process 1500 or any step thereof could be performed on, or provided by, any of the devices shown in FIGS. 2-3. For example, process 1500 may be executed by control circuitry 204 (FIG. 2) as instructed by an audience management system, or a module thereof (e.g., implemented on audience management module 328 (FIG. 3)) in order to assign prices to data structures. In addition, one or more steps of process 1500 may be incorporated into or combined with one or more steps of any other process or embodiment (e.g., as described in relation to FIGS. 12-14 and 16).

At step 1502, the audience management system initiates process 1500. For example, in some embodiments, audience management system may initiate process 1500 in response to a user request (e.g., received via user input interface 210 (FIG. 2)) requesting to select an advertising slot.

At step 1504, the audience management system stores, in a memory, a plurality of data structures, each data structure representing one a plurality of advertising slots. As discussed above in relation to FIG. 13, in some embodiments, the audience management system may store (e.g., in storage 204 (FIG. 2) and/or any database accessible via communications network 314 (FIG. 3)) (e.g., via processing circuitry 204 (FIG. 2)) a plurality of data structures, in which each data structure may correspond to a particular advertising slot.

At step 1506, the audience management system stores, in each of the plurality of data structures a price value associated with a respective advertising slot. For example, as discussed in relation to FIGS. 7 and 8, the audience management system may manage advertisement slots associated with cells (e.g., cell 814 (FIG. 8)) in a grid arrangement (e.g., grid arrangement 802 (FIG. 8)). Each cell may be associated with a data structure that includes data relating to its respective content sources, time periods, inventory, projected inventory, pricing, historical viewership data, audience metrics and analytics, or any other suitable information described herein.

At step 1508, the audience management system receives a user selection of a fixed price value. For example, the audience management system may receive (e.g., via user input interface 210 (FIG. 2)) a user selection entering a fixed price value for an advertising slot in response to a user selection of a cell (e.g., cell 814 (FIG. 8)) in a grid arrangement (e.g., grid arrangement 802 (FIG. 8)) displayed (e.g., on display 212 (FIG. 2)) by the audience management system.

At step 1510, the audience management system stores the fixed price value as the price value of a first data structure of the plurality of data structures. For example, the fixed price value associated with the data structure may be stored (e.g., in storage 204 (FIG. 2) and/or any database accessible via communications network 314 (FIG. 3)) along with other information related to the data structure such as data structure that includes data relating to its respective content sources, time periods, inventory, projected inventory, pricing, historical viewership data, audience metrics and analytics, or any other suitable information described herein.

At step 1512, the audience management system automatically updates the price value of each of the plurality of data structures without changing the price value of the first data structure. For example, a user (e.g., via user input interface 210 (FIG. 2)) may designate a particular advertising slot to have a fixed price. The audience management system may automatically (e.g., via processing circuitry 204 (FIG. 2)) update the price value of each of the plurality of data structures without changing the price value of the first data structure.

For example, once the price is fixed for a first advertising slot, the audience management system may update (e.g., via processing circuitry 204 (FIG. 2)) the pricing information associated with a remainder of the data structures based on a projected demand of each of the remainder of the data structures. In some embodiments, the audience management system may determine (e.g., via processing circuitry 204 (FIG. 2)) the projected demand may be based on the fixed price (e.g. setting a high fixed price may be predicted to increase the demand of "nearby" advertising slots on the same television channel). The audience management system may determine (e.g., via processing circuitry 204 (FIG. 2)) projected demand by analyzing historical inventory data, projected inventory data, current demand, audience estimates, or any suitable combination thereof.

In some embodiments, the projected demand and/or the historical inventory data, projected inventory data, current demand, audience estimates, or any suitable combination thereof may be retrieve from local storage (e.g., storage 208 (FIG. 2) and/or any location accessible via communications network 314 (FIG. 3)). In some embodiments, the projected demand and/or data associated with generating the projected demand may be received via a data-feed in real-time. Alternatively, the projected demand and/or data associated with generating the projected demand may be periodically updated/received (e.g., in response to a user selection establishing a fixed price).

At step 1514, the audience management system ends process 1500. In some embodiments, the audience management system may return to step 1504 and perform another iteration of process 1500 (e.g., associated with another user selection of a fixed price value).

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-3 could be used to perform one of more of the steps in FIG. 15.

Figure 16:
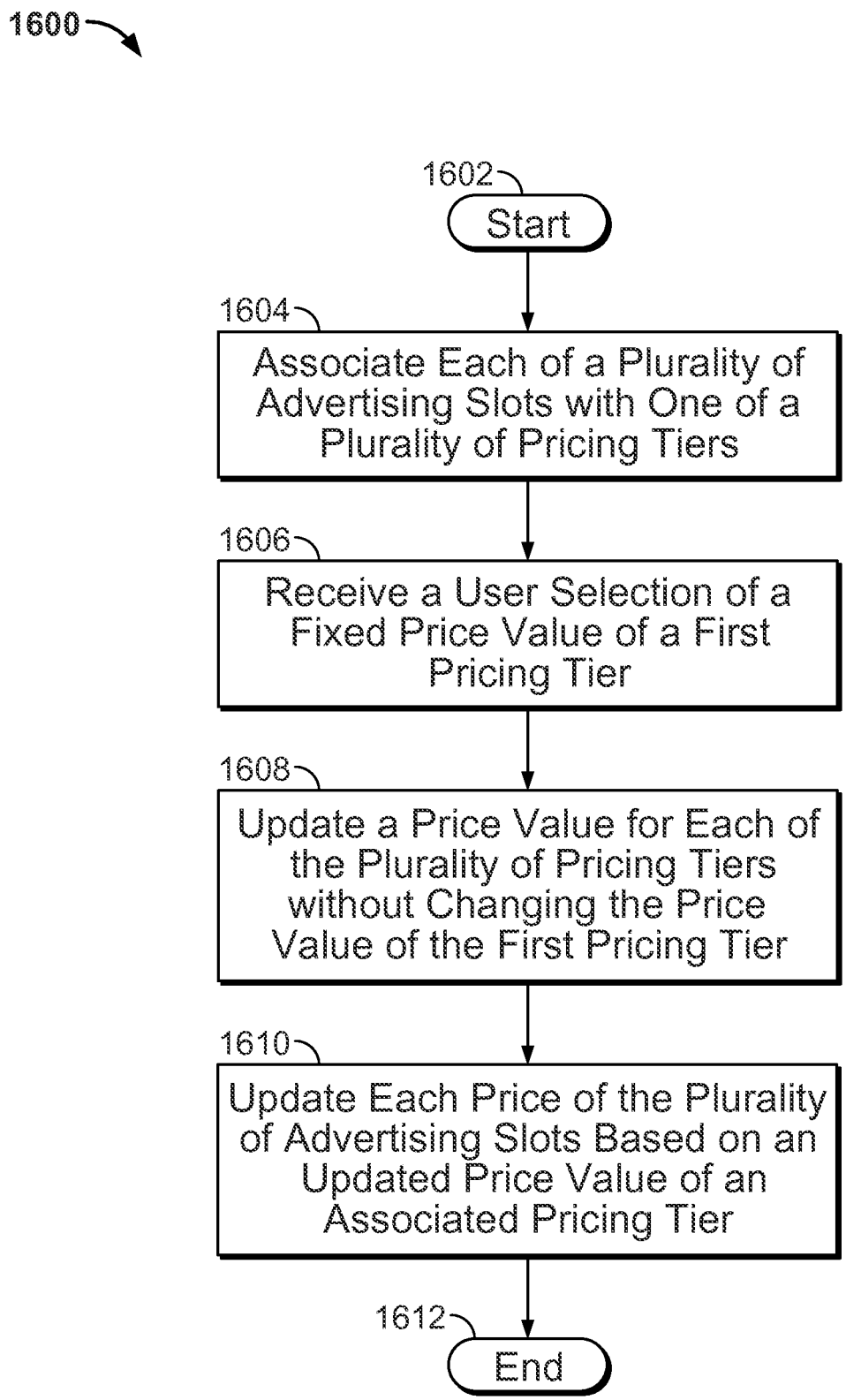
FIG. 16 is a flowchart of the illustrative steps involved in static and dynamic pricing of pricing tiers for a media plan in accordance with some embodiments of the disclosure.

FIG. 16 is a flowchart of the illustrative steps involved in static and dynamic pricing of pricing tiers for a media plan. It should be noted that process 1600 or any step thereof could be performed on, or provided by, any of the devices shown in FIGS. 2-3. For example, process 1600 may be executed by control circuitry 204 (FIG. 2) as instructed by an audience management system, or a module thereof (e.g., implemented on audience management module 328 (FIG. 3)) in order to assign prices to data structures. In addition, one or more steps of process 1600 may be incorporated into or combined with one or more steps of any other process or embodiment (e.g., as described in relation to FIGS. 12-15).

At step 1602, the audience management system initiates process 1600. For example, in some embodiments, audience management system may initiate process 1600 in response to a user request (e.g., received via user input interface 210 (FIG. 2)) requesting to select an advertising slot.

At step 1604, the audience management system associates (e.g., via processing circuitry 204 (FIG. 2)) each of a plurality of advertising slots with one of a plurality of pricing tiers. For example, the audience management system may use pricing tiers to set the prices of a plurality of advertising slots by associating each of the plurality of advertising slots with one of the plurality of pricing tiers.

At step 1606, the audience management system receives a user selection of a fixed price value of a first pricing tier. For example, the audience management system may receive (e.g., via user input interface 210 (FIG. 2)) a user selection entering a fixed price value of a pricing tier for a plurality of advertising slots in response to a user selection.

At step 1608, the audience management system update a price value for each of the plurality of pricing tiers without changing the price value of the first pricing tier. For example, once the user sets the fixed price for the pricing tier, the audience management system may update a price value for each of the plurality of pricing tiers without changing the price value of the fixed pricing tier.

At step 1610, the audience management system updates each price of the plurality of advertising slots based on an updated price value of an associated pricing tier. The audience management system then updates (e.g., via control circuitry 204 (FIG. 2)) each price value of the plurality of advertising slots based on an updated price value of an associated pricing tier. For example, the updated price value of an associated pricing tier may be stored (e.g., in storage 204 (FIG. 2) and/or any database accessible via communications network 314 (FIG. 3)) along with other information related to one or more data structure.

At step 1612, the audience management system ends process 1600. In some embodiments, the audience management system may return to step 1604 and perform another iteration of process 1600 (e.g., associated with another user selection of a fixed price value of a first pricing tier).

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-3 could be used to perform one of more of the steps in FIG. 16.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

It should be understood that the above steps of the flow diagrams of FIGS. 12-16 may be executed or performed in any order or sequence not limited to the order and sequence shown and described in the figures. Also, some of the above steps of the flow diagrams of FIGS. 12-16 may be executed or performed substantially simultaneously, where appropriate.

The above-described embodiments of the present disclosure are presented for purposes of illustration and not of limitation, and the present disclosure is limited only by the claims which follow.

What is claimed is:

1. A method for selecting advertising slots in an advertising campaign, the method comprising:
generating for display a plurality of cells in a grid arrangement, wherein:
    each of the plurality of cells is associated with an advertising slot corresponding to a content source and a time period, and
    each of the plurality of cells includes a representation of an audience of the associated advertising slot;
ranking a plurality of advertising slots based on audience information associated with each advertising slot;
identifying a subset of the plurality of cells that includes cells associated with highest ranked advertising slots of the plurality of advertising slots, wherein a sum of budget weights associated with each advertising slot associated with the identified subset is less than or equal to a preselected budget value;
adding advertising slots associated with each cell of the subset of the plurality of cells to an advertising campaign plan;
identifying a first cell of the subset of the plurality of cells; and
executing a function with respect to a first advertising slot associated with the first cell.

2. The method of claim 1, wherein executing the function comprises generating for display an updated audience representation for each of the plurality of cells based on selections associated with different advertising campaigns.

3. The method of claim 1, wherein the subset of the plurality of cells is a first subset, and wherein identifying the first cell of the plurality of cells comprises:
receiving a user selection of a content source or time period associated with the first cell; and
identifying a second subset of the plurality of cells corresponding to the selected content source or time period, the second subset including the first cell,
wherein executing the function comprises updating a weight value related to an associated advertising slot of each of the cells in the second subset.

4. The method of claim 1, wherein executing the function comprises generating for display additional audience-related information for the first advertising slot associated with the first cell.

5. The method of claim 1, wherein the representation of the audience comprises at least one of an audience composition, an audience index, and projected impressions.

6. The method of claim 1, wherein executing the function comprises removing the first advertising slot corresponding to the first cell from the advertising campaign plan.

7. The method of claim 1, further comprising generating for display for each of the plurality of cells an indicator that indicates whether the advertising slot associated with the cell has been added to the advertising campaign plan.

8. The method of claim 1, further comprising receiving a user selection of a fixed price value, wherein executing the function comprises:
assigning the fixed price value to the first advertising slot associated with the first cell; and
updating a price value of an advertising slot associated with each of the plurality of cells without changing the fixed price value assigned to the first advertising slot.

9. The method of claim 1, wherein identifying the subset of the plurality of cells further comprises:
selecting a highest ranked advertising slot of the plurality of advertising slots associated with a second cell not in the subset;
determining that a budget weight of the highest ranked advertising slot is less than a difference between the sum of budget values associated with each advertising slot associated with the identified subset and the preselected budget value; and
adding the second cell to the subset.

10. The method of claim 1, wherein the plurality of cells is a first plurality of cells, and wherein ranking the plurality of advertising slots further comprises:
    generating for display a second plurality of cells in the grid arrangement;
    receiving a user selection of the first plurality of cells from the second plurality of cells; and
    in response to receiving the user selection, performing the ranking.

11. A system for selecting advertising slots in an advertising campaign, the system comprising:
    processing circuitry, wherein the processing circuitry is configured to:
        generate for display a plurality of cells in a grid arrangement, wherein:
            each of the plurality of cells is associated with an advertising slot corresponding to a content source and a time period, and
            each of the plurality of cells includes a representation of an audience of the associated advertising slot;
        rank a plurality of advertising slots based on audience information associated with each advertising slot;
        identify a subset of the plurality of cells that includes cells associated with highest ranked advertising slots of the plurality of advertising slots, wherein a sum of budget weights associated with each advertising slot associated with the identified subset is less than or equal to a preselected budget value;
        add advertising slots associated with each cell of the subset of the plurality of cells to an advertising campaign plan;
        identify a first cell of the subset of the plurality of cells; and
        execute a function with respect to a first advertising slot associated with the first cell.

12. The system of claim 11, wherein the processing circuitry is further configured to generate for display an updated audience representation for each of the plurality of cells based on selections associated with different advertising campaigns.

13. The system of claim 11 wherein the subset of the plurality of cells is a first subset and, wherein the processing circuitry is further configured to:
    receive a user selection of a content source or time period associated with the first cell;
    identify a second subset of the plurality of cells corresponding to the selected content source or time period, the second subset including the first cell; and
    update a weight value related to an associated advertising slot of each of the cells in the second subset.

14. The system of claim 11, wherein the processing circuitry is further configured to generate for display additional audience-related information for the first advertising slot associated with the first cell.

15. The system of claim 11, wherein the representation of the audience comprises at least one of an audience composition, an audience index, and projected impressions.

16. The system of claim 11, wherein the processing circuitry is further configured to remove the first advertising slot corresponding to the first cell from the advertising campaign plan.

17. The system of claim 11, wherein the processing circuitry is further configured to generate for display for each of the plurality of cells an indicator that indicates whether the advertising slot associated with the cell has been added to the advertising campaign plan.

18. The system of claim 11, wherein the processing circuitry is further configured to:
    receive a user selection of a fixed price value;
    assign the fixed price value to the first advertising slot associated with the first cell; and
    update a price value of an advertising slot associated with each of the plurality of cells without changing the fixed price value assigned to the first advertising slot.

19. The system of claim 11, wherein the processing circuitry configured to identify the subset of the plurality of cells is further configured to:
    select a highest ranked advertising slot of the plurality of advertising slots associated with a second cell not in the subset;
    determine that a budget weight of the highest ranked advertising slot is less than a difference between the sum of budget values associated with each advertising slot associated with the identified subset and the preselected budget value; and
    add the second cell to the subset.

20. The system of claim 11, wherein the plurality of cells is a first plurality of cells, and wherein the processing circuitry configured to rank the plurality of advertising slots is further configured to:
    generate for display a second plurality of cells in the grid arrangement;
    receive a user selection of the first plurality of cells from the second plurality of cells; and
    in response to receiving the user selection, perform the ranking.

* * * * *